US007846982B2

(12) United States Patent
Kiefer et al.

(10) Patent No.: US 7,846,982 B2
(45) Date of Patent: *Dec. 7, 2010

(54) PROTON CONDUCTING ELECTROLYTE MEMBRANE HAVING REDUCED METHANOL PERMEABILITY AND THE USE THEREOF IN FUEL CELLS

(75) Inventors: Joachim Kiefer, Losheim am See (DE); Oemer Uensal, Mainz (DE); Gordon Calundann, Plainfield, NJ (US); James Crivello, Clifton Park, NY (US)

(73) Assignee: Pemeas GmbH (DE)

( * ) Notice: Subject to any disclaimer, the term of this patent is extended or adjusted under 35 U.S.C. 154(b) by 390 days.

This patent is subject to a terminal disclaimer.

(21) Appl. No.: 10/506,387

(22) PCT Filed: Mar. 4, 2003

(86) PCT No.: PCT/EP03/02397

§ 371 (c)(1),
(2), (4) Date: Jan. 25, 2005

(87) PCT Pub. No.: WO03/074597

PCT Pub. Date: Sep. 12, 2003

(65) Prior Publication Data

US 2005/0118477 A1 Jun. 2, 2005

(30) Foreign Application Priority Data

Mar. 6, 2002 (DE) ............................... 102 09 685
Mar. 11, 2002 (DE) ............................... 102 10 499

(51) Int. Cl.
C08J 5/22 (2006.01)
B01J 41/12 (2006.01)

(52) U.S. Cl. .......................................... 521/30; 521/27

(58) Field of Classification Search .................. 521/27, 521/30
See application file for complete search history.

(56) References Cited

U.S. PATENT DOCUMENTS

| 3,224,908 A | 12/1965 | Duch et al. |
| 3,293,088 A | 12/1966 | Herbst et al. |
| 3,313,783 A | 4/1967 | Iwakura et al. |
| 3,737,045 A | 6/1973 | Hashimoto et al. |
| 3,808,305 A | 4/1974 | Gregor et al. |
| 4,012,303 A | 3/1977 | D'Agostino et al. |
| 4,075,093 A | 2/1978 | Walch et al. |
| 4,187,333 A | 2/1980 | Rembaum et al. |
| 4,537,668 A | 8/1985 | Gaussens et al. |
| 4,622,276 A | 11/1986 | Walsh |
| 4,634,530 A | 1/1987 | Kuder et al. |
| 5,098,985 A | 3/1992 | Harris et al. |
| 5,211,984 A | 5/1993 | Wilson |
| 5,218,076 A | 6/1993 | Madison et al. |
| 5,312,895 A | 5/1994 | Dang et al. |
| 5,492,996 A | 2/1996 | Dang et al. |
| 5,599,639 A | 2/1997 | Sansone et al. |
| 5,633,337 A | 5/1997 | Tan et al. |
| 5,643,968 A | 7/1997 | Andreola et al. |
| 5,656,386 A | 8/1997 | Scherer et al. |
| 5,674,969 A | 10/1997 | Sikkema et al. |
| 6,030,718 A | 2/2000 | Fuglevand et al. |
| 6,087,032 A | 7/2000 | Yoshitake et al. |
| 6,096,369 A | 8/2000 | Anders et al. |
| 6,110,616 A | 8/2000 | Sheikh-Ali et al. |
| 6,197,147 B1 | 3/2001 | Bönsel et al. |
| 6,248,469 B1 | 6/2001 | Formato et al. |
| 6,264,857 B1 | 7/2001 | Kreuer et al. |
| 6,368,587 B1 | 4/2002 | Anders et al. |
| 6,607,856 B2 * | 8/2003 | Suzuki et al. .................. 429/30 |
| 7,235,320 B2 | 6/2007 | Calundann et al. |
| 2001/0038937 A1 | 11/2001 | Suzuki et al. |
| 2002/0015879 A1 | 2/2002 | Gascoyne et al. |
| 2002/0045085 A1 | 4/2002 | Formato et al. |
| 2003/0012988 A1 | 1/2003 | Gascoyne et al. |
| 2003/0031909 A1 | 2/2003 | Gascoyne et al. |

(Continued)

FOREIGN PATENT DOCUMENTS

CA 2 491 239 A1 1/2004

(Continued)

OTHER PUBLICATIONS

Osaheni, J.A. and Jenekhe, S.A., "Synethesis of Processing of Heterocyclic Polymers as Electronic, Optoelectronic, and Nonlinear Optical Materials. 4. New Conjugated Rigid-Rod Poly(benzobis(imidazole))s," *Macomolecules* 28:1172-1179 (1995). Database Caplus, American Chemical Society: XP002270164 retrieved from STN Database accession No. 2002:378564, Abstract of JP 2002 146014 A (Toyobo Co. Ltd.); May 22, 2002.
Polymeric Materials Science and Engineering, Y. Sakaguchi et al., vol. 84, 2001, p. 899-900.

(Continued)

*Primary Examiner*—Helen L. Pezzuto
(74) *Attorney, Agent, or Firm*—Connolly Bove Lodge & Hutz LLP

(57) ABSTRACT

The present invention relates to a proton-conducting electrolyte membrane obtainable by a process comprising the steps:
A) swelling a polymer film with a liquid comprising a vinyl-containing sulphonic acid and
B) polymerising the vinyl-containing sulphonic acid present in liquid introduced in step A).

A membrane according to the invention is very versatile on account of its excellent chemical and thermal properties and may be used, in particular, as a polymer electrolyte membrane (PEM) in what are known as PEM fuel cells.

13 Claims, No Drawings

U.S. PATENT DOCUMENTS

| | | |
|---|---|---|
| 2004/0096734 A1 | 5/2004 | Calundann et al. |
| 2004/0101731 A1 | 5/2004 | Jakoby et al. |
| 2004/0127588 A1 | 7/2004 | Calumdann et al. |
| 2004/0131909 A1 | 7/2004 | Soczka-Guth et al. |
| 2004/0247974 A1 | 12/2004 | Uensal et al. |
| 2005/0053820 A1 | 3/2005 | Calundann et al. |
| 2005/0084727 A1 | 4/2005 | Kiefer et al. |
| 2005/0118477 A1 | 6/2005 | Kiefer et al. |
| 2005/0118478 A1 | 6/2005 | Kiefer et al. |
| 2005/0147859 A1 | 7/2005 | Christ et al. |
| 2006/0210881 A1 | 9/2006 | Calundann et al. |
| 2007/0292734 A1 | 12/2007 | Kiefer et al. |

FOREIGN PATENT DOCUMENTS

| | | |
|---|---|---|
| CA | 2 496 589 A1 | 3/2004 |
| CA | 2 498 370 A1 | 4/2004 |
| DE | 1 301 578 | 8/1969 |
| DE | 196 53484 A1 | 6/1998 |
| DE | 101 48 131 A1 | 5/2003 |
| EP | 0 265 921 A2 | 5/1988 |
| EP | 0 265 921 A3 | 5/1988 |
| EP | 0 476 560 A1 | 9/1991 |
| EP | 0 846 733 A2 | 6/1998 |
| EP | 0 893 165 A2 | 1/1999 |
| EP | 1 110 992 A1 | 6/2001 |
| EP | 1 202 365 A1 | 5/2002 |
| EP | 1354907 A1 | 10/2003 |
| JP | 53-97988 | 8/1978 |
| JP | 2002146014 | 5/2002 |
| JP | 2003022709 | 1/2003 |
| WO | WO 94/25506 A1 | 11/1994 |
| WO | WO 99/10165 A1 | 3/1999 |
| WO | WO 00/49069 A1 | 8/2000 |
| WO | WO 00 54351 | 9/2000 |
| WO | WO 01/45192 A1 | 6/2001 |
| WO | WO 01/94450 A2 | 12/2001 |
| WO | WO 02/36249 A1 | 5/2002 |
| WO | WO 02/38650 A1 | 5/2002 |
| WO | WO 02/071518 A1 | 9/2002 |
| WO | WO 02/081547 A1 | 10/2002 |
| WO | WO 02/088219 A1 | 11/2002 |
| WO | WO 02/102881 A1 | 12/2002 |
| WO | WO 03/007411 A2 | 1/2003 |
| WO | WO 03/022412 A2 | 3/2003 |
| WO | WO 03/022412 A3 | 3/2003 |

OTHER PUBLICATIONS

"Production of Cation Exchange Membrane", *Patent Abstracts of Japan*, vol. 02, No. 131, p. 2798, Oct. 31, 1978.

Office Action from U.S. Appl. No. 10/506,880, dated Jun. 29, 2007.

Office Action from U.S. Appl. No. 10/506,880, dated Feb. 14, 2008.

Office Action from U.S. Appl. No. 10/506,880, dated Sep. 11, 2008.

Spry, R. J., et al. "Anisotropic Ionic Conductivity of Lithium-Doped Sulfonated PBI," *J. Of Polymer Sci.: Part B: Polymer Physics*, 35: 2925-2933 (1997) (month of publication not available).

Y. Sakaguchi, et al., "Preparation and Properties of Sulfonated or Phosphonated Polybenzimidazoles and Polybenzoxazoles," *Am. Chem. Soc., Polymeric Materials Science and Engineering*, 84: 899-900 (2001) (month of publication not available).

Zouahri, et al. "Synthesis of Ion Exchange Membranes from Ozonized High Density Polyethylene," *European Polymer Journal*, 38: 2247-2254 (2002) (month of publication not available).

Interview Summary from U.S. Appl. No. 10/506,880, dated Apr. 9, 2009.

Office Action made Final from U.S. Appl. No. 10/506,880, dated Apr. 14, 2009.

Advisory Action from U.S. Appl. No. 10/506,880, dated Jun. 22, 2009.

Office Action made Final from U.S. Appl. No. 10/506,646, dated Jun. 22, 2009.

Office Action from U.S. Appl. No. 10/506,622, dated Jun. 28, 2007.

Office Action made Final from U.S. Appl. No. 10/506,622, dated Feb. 14, 2008.

Office Action from U.S. Appl. No. 10/506,622, dated Sep. 11, 2008.

Office Action made Final from U.S. Appl. No. 10/506,622, dated Apr. 14, 2009.

Advisory Action from U.S. Appl. No. 10/506,622, dated Jun. 19, 2009.

Date of Mailing Nov. 12, 2008, Office Action U.S. Appl. No. 10/506,646.

\* cited by examiner

PROTON CONDUCTING ELECTROLYTE MEMBRANE HAVING REDUCED METHANOL PERMEABILITY AND THE USE THEREOF IN FUEL CELLS

RELATED APPLICATIONS

This application is the U.S. National Stage of International Application No. PCT/EP03/02397, filed 4 Mar. 2003, published in German, and claims priority under 35 U.S.C. §119 or 365 to German Application No. 102 09 685.6, filed 6 Mar. 2002 and 102 10 499.9, filed 11 Mar. 2002.

The present invention relates to a proton-conducting electrolyte membrane with low methanol permeability based on polyvinyl sulphonic acid, which is very versatile on account of its excellent chemical properties and may be used, in particular, as a polymer electrolyte membrane (PEM) in what are known as PEM fuel cells.

A fuel cell usually contains an electrolyte and two electrodes that are separated by the electrolyte. In the case of a fuel cell, a fuel such as hydrogen gas or a methanol and water mixture is supplied to one of the two electrodes and an oxidising agent such as oxygen gas or air to the other electrode, and chemical energy derived from oxidation of the fuel is thus converted directly into electrical energy. Protons and electrons are formed during the oxidation reaction.

The electrolyte is permeable to hydrogen ions, i.e. protons, but not to reactive fuels such as the hydrogen gas or methanol and the oxygen gas.

A fuel cell generally has a plurality of individual cells known as MEEs (membrane electrode units), each containing one electrolyte and two electrodes separated by the electrolyte.

Solids such as polymer electrolyte membranes or liquids such as phosphoric acid are used as the electrolyte for the fuel cell. Polymer electrolyte membranes have recently attracted attention as electrolytes for fuel cells. There are basically two different categories of polymer membrane.

The first category includes cation exchange membranes consisting of a polymer framework that contains covalently bound acid groups, preferably sulphonic acid groups. The sulphonic acid group passes into an anion while giving off a hydrogen ion and therefore conducts protons. The mobility of the proton and therefore the proton conductivity is directly linked to the water content. Owing to the excellent miscibility of methanol and water, these cation exchange membranes have high methanol permeability and are therefore unsuitable for applications in a direct methanol fuel cell. If the membrane dries out, for example owing to a high temperature, the conductivity of the membrane and consequently the performance of the fuel cell decrease drastically. The operating temperatures of fuel cells containing these cation exchange membranes are therefore limited to the boiling temperature of water. The humidification of the fuel cells is a great technical challenge for the use of polymer electrolyte membrane fuel cells (PEMFCs) in which conventional sulphonated membranes such as Nafion are used.

Thus, for example, perfluorosulphonic acid polymers are used as materials for polymer electrolyte membranes. The perfluorosulphonic acid polymer (for example, Nafion) generally has a perfluorinated hydrocarbon framework, such as a copolymer of tetrafluoroethylene and trifluorovinyl, and a side chain, bound thereto, with a sulphonic acid group, such as a side chain with a sulphonic acid group bound to a perfluoroalkylene group.

Cation exchange membranes are preferably organic polymers with covalently bound acid groups, in particular sulphonic acid. Processes for the sulphonation of polymers are described in F. Kucera et. al. Polymer Engineering and Science 1988, Vol. 38, No 5, 783-792.

The most important types of cation exchange membranes, which are commercially used in fuel cells, are listed hereinafter.

The perfluorosulphonic acid polymer Nafion® (U.S. Pat. No. 3,692,569) is the most important representative. This polymer may be dissolved, as described in U.S. Pat. No. 4,453,991, and may then be used as an ionomer. Cation exchange membranes are also obtained by filling a porous support with an ionomer of this type. Expanded Teflon is a preferred support (U.S. Pat. No. 5,635,041).

A further perfluorinated cation exchange membrane may be produced by copolymerisation from trifluorostyrene and sulphonyl-modified trifluorostyrene, as described in U.S. Pat. No. 5,422,411. Composite membranes consisting of a porous support, in particular expanded Teflon, filled with ionomers consisting of these sulphonyl-modified trifluorostyrene copolymers are described in U.S. Pat. No. 5,834,523.

U.S. Pat. No. 6,110,616 describes copolymers of butadiene and styrene and the subsequent sulphonation thereof to produce cation exchange membranes for fuel cells.

A further class of partially fluorinated cation exchange membranes may be produced by radiation grafting and subsequent sulphonation. In this case, a grafting reaction, preferably with styrene, is carried out on a previously irradiated polymer film, as described in EP667983 or DE19844645. Sulphonation of the side chains then takes place in a subsequent sulphonation reaction. Crosslinking may also be carried out simultaneously with grafting, and the mechanical properties thus be changed.

In addition to the above-mentioned membranes, a further class of non-fluorinated membranes has been developed by sulphonation of thermoplastics materials which are stable at high temperatures. Membranes of sulphonated polyetherketones (DE4219077, EP96/01177), sulphonated polysulphone (J. Membr. Sci. 83 (1993) p. 211) or sulphonated polyphenylene sulphide (DE19527435) are accordingly known.

Ionomers produced from sulphonated polyetherketones are described in WO 00/15691.

Acid and base blend membranes that are produced by mixing sulphonated polymers and basic polymers, as described in DE19817374 or WO 01/18894, are also known.

The properties of the membrane may be further improved by mixing a cation exchange membrane known from the prior art with a polymer which is stable at high temperatures. The production and properties of cation exchange membranes consisting of blends of sulphonated PEK and a) polysulphones (DE4422158), b) aromatic polyamides (42445264) or c) polybenzimidazole (DE19851498) are described.

All these cation exchange membranes have the drawback that the membrane has to be moistened, the operating temperature is limited to 100° C., and the membranes have high methanol permeability. These drawbacks are due to the conductivity mechanism of the membrane, in which proton transfer is associated with water molecule transfer. This is known as the "vehicle mechanism" (K.-D. Kreuer, Chem. Mater. 1996, 8, 610-641).

Polymer electrolyte membranes containing complexes of basic polymers and strong acids have been developed as the second category. WO96/13872 and the corresponding U.S. Pat. No. 5,525,436 accordingly describe a process for producing proton-conducting polymer electrolyte membranes, in which a basic polymer, such as polybenzimidazole; is treated with a strong acid, such as phosphoric acid, sulphuric acid, etc.

The doping of a polybenzimidazole in phosphoric acid is described In *J. Electrochem. Soc.*, Vol. 142, No. 7, 1995, p. L121-L123.

With the basic polymer membranes known from the prior art, either the mineral acid used to achieve the necessary proton conductivity (usually concentrated phosphoric acid) is introduced after shaping or, alternatively, the basic polymer membrane is produced directly from polyphosphoric acid, as in German Patent Application Nos. 10117686.4, 10144815.5 and 10117687.2. The polymer is used as a support for the electrolyte consisting of the highly concentrated phosphoric acid or polyphosphoric acid. The polymer membrane fulfils other functions; in particular it must have high mechanical strength and act as a separator for the two fuels mentioned in the introduction.

Significant advantages of a membrane doped with phosphoric acid or polyphosphoric acid are that a fuel cell, in which a polymer electrolyte membrane of this type is used, may be operated at temperatures above 100° C. without humidification of the fuels, which is otherwise necessary. This is due to the ability of phosphoric acid to transfer protons without additional water by what is known as the Grotthus mechanism (K.-D. Kreuer, Chem. Mater. 1996, 8, 610-641).

Further advantages for the fuel cell system arise from the possibility of operating at temperatures above 100° C. On the one hand, the sensitivity of the Pt catalyst to gaseous impurities, in particular CO, is markedly reduced. CO is formed as a by-product during reforming of the hydrogen-rich gas from carbon-containing compounds, such as natural gas, methanol or petrol, or also as an intermediate product during direct oxidation of methanol. The CO content of the fuel typically has to be less than 100 ppm at temperatures <100° C. However, 10000 ppm CO or more may even be tolerated at temperatures in the range of 150-200° C. (N. J. Bjerrum et. al. Journal of Applied Electrochemistry, 2001, 31, 773-779). This considerably simplifies the preceding reforming process and therefore reduces the cost of the entire fuel cell system.

A great advantage of fuel cells is that the fuel energy is converted directly into electrical energy and heat during the electrochemical reaction. Water is formed as the reaction product at the cathode. Heat is therefore produced as a by-product during the electrochemical reaction. In applications where only the current is used to drive electric motors, for example in automotive applications, or as a versatile substitute for battery systems, the heat has to be carried off to prevent overheating of the system. Additional energy-consuming devices, which further reduce the overall electrical efficiency of the fuel cell, are then required for cooling purposes. The heat may be efficiently used with existing technology, for example in heat exchangers, and for stationary applications such as centralised or decentralised power and heat generation. High temperatures are desired, to increase efficiency. If the operating temperature exceeds 100° C. and if the temperature difference between the ambient temperature and the operating temperature is great, it becomes possible to cool the fuel cell system more efficiently or to use small cooling surfaces and dispense with additional devices in comparison with fuel cells that have to be operated at less than 100° C. due to humidification of the membrane.

In addition to these advantages, a fuel cell system of this type has a significant drawback. Phosphoric acid or polyphosphoric acid is in the form of an electrolyte, which is not bound permanently to the basic polymer due to ion interaction and may be washed out by water. As described above, water is formed on the cathode during the electrochemical reaction. If the operating temperature is above 100° C., the majority of the water is carried off as steam through the gas diffusion electrode and the loss of oxygen is very slight. If the operating temperature drops below 100° C., however, for example when the cell is started and stopped or when operating with partial load, when high current efficiency is desired, the water formed condenses and may increase the washing out of the electrolyte, highly concentrated phosphoric acid or polyphosphoric acid. With the mode of operation of the fuel cell described hereinbefore, this may lead to a continuous loss in conductivity and cell performance, which may reduce the service life of the fuel cell.

Furthermore, the known phosphoric acid doped membranes cannot be used in what is known as the direct methanol fuel cell (DMFC). These cells are of particular interest, however, because a mixture of methanol and water is used as the fuel. If a known membrane based on phosphoric acid is used, the fuel cell fails after quite a short time.

It is accordingly the object of the present invention to provide a novel polymer electrolyte membrane, in which washing out of the electrolyte is prevented. A fuel cell containing a polymer electrolyte membrane according to the invention should be suitable for pure hydrogen and for numerous carbon-containing fuels, in particular natural gas, petrol, methanol and biomass.

Moreover, production of a membrane according to the invention should be inexpensive and simple. A further object of the present invention was to provide polymer electrolyte membranes with high performance, in particular high conductivity.

Moreover, a polymer electrolyte membrane is to be provided, which has high mechanical strength, for example a high modulus of elasticity, high tear strength, low creep and high fracture toughness.

It was accordingly a further object of the present invention to provide a membrane, which has minimal permeability to a wide variety of fuels, such as hydrogen or methanol, even during operation, this membrane also having minimal permeability to oxygen.

These objects are achieved by the production of a liquid comprising a vinyl-containing sulphonic acid and by a process for producing a polymer electrolyte membrane by swelling a film of a polymer in this liquid and subsequent polymerisation to a polyvinyl sulphonic acid. A polymer electrolyte membrane according to the invention has very low permeability to methanol and is suitable, in particular, for use in a DMFC. This allows continuous operation of a fuel cell with a plurality of fuels such as hydrogen, natural gas, petrol, methanol or biomass. The membranes allow particularly high activity of these fuels. Methanol oxidation can take place with high activity, owing to the high temperatures.

Membranes according to the present invention also exhibit high mechanical strength, in particular a high modulus of elasticity, high tear strength, low creep and high fracture toughness. These membranes also have a surprisingly long service life.

The present invention accordingly relates to a stable proton-conducting electrolyte membrane obtainable by a process comprising the steps:

A) swelling a polymer film with a liquid comprising a vinyl-containing sulphonic acid and B) polymerising the vinyl-containing sulphonic acid present in liquid introduced in step A).

The polymer film used in step A) is a film exhibiting swelling of at least 3% in the vinyl sulphonic acid-containing liquid. Swelling is understood to be an increase of at least 3% by weight in the weight of the film. Swelling is preferably at least 5%, particularly preferably at least 10%.

The swelling Q is determined gravimetrically from the mass of the film prior to swelling $m_0$ and the mass of the film after polymerisation according to step B), $m_2$.

$$Q=(m_2-m_0)/m_0\times100$$

Swelling preferably takes place at a temperature above 0° C., in particular between ambient temperature (20° C.) and 180° C. in a vinylsulphonic acid-containing liquid containing at least 5% by weight of vinylsulphonic acid. Swelling may also be carried out at increased pressure. The limits are imposed by economic considerations and technical facilities.

The polymer film used for swelling generally has a thickness in the range of 5 to 3000 μm, preferably 10 to 1500 μm and particularly preferably. The production of these films from polymers is generally known, and some of them are commercially available. The term "polymer film" means that the film to be used for swelling comprises polymers, but this film may also contain further generally conventional additives.

Preferred polymers include inter alia polyolefins, such as poly(chloroprene), polyacetylene, polyphenylene, poly(p-xylylene), polyarylmethylene, polystyrene, polymethylstyrene, polyvinylalcohol, polyvinylacetate, polyvinylether, polyvinylamine, poly(N-vinylacetamide), polyvinylimidazole, polyvinylcarbazole, polyvinylpyrrolidone, polyvinylpyridine, polyvinylchloride, polyvinylidenechloride, polytetrafluoroethylene, polyhexafluoropropylene, copolymers of PTFE with hexafluoropropylene, with perfluoropropylvinylether, with trifluoronitrosomethane, with carbalkoxy-perfluoralkoxyvinylether, polychlorotrifluoroethylene, polyvinylfluoride, polyvinylidenefluoride, polyacrolein, polyacrylamide, polyacrylnitrile, polycyanacrylate, polymethacrylimide, cycloolefinic copolymers, in particular of norbornene;

polymers with C—O bonds in the main chain, for example polyacetal, polyoxymethylene, polyether, polypropyleneoxide, polyepichlorhydrin, polytetrahydrofuran, polyphenyleneoxide, polyetherketone, polyester, in particular polyhydroxyacetic acid, polyethyleneterephthalate, polybutyleneterephthalate, polyhydroxybenzoate, polyhydroxypropionic acid, polypivalolactone, polycaprolactone, polymalonic acid, polycarbonate;

polymers with C—S bonds in the main chain, for example polysulphide ether, polyphenylenesulphide, polyethersulphone;

polymers with C—N bonds in the main chain, for example polyimines, polyisocyanides, polyetherimine, polyetherimides, polyaniline, polyaramides, polyamides, polyhydrazides, polyurethanes, polyimides, polyazoles, polyazole etherketone, polyazines;

liquid crystalline polymers, in particular Vectra and inorganic polymers, for example polysilanes, polycarbosilanes, polysiloxanes, polysilicic acid, polysilicates, silicones, polyphosphazene and polythiazyl.

According to a particular aspect of the present invention, polymers that are stable at high temperatures and contain at least one nitrogen, oxygen and/or sulphur atom in one or more repeat units are used.

A polymer that may be operated continuously as a polymer electrolyte in a fuel cell at temperatures of more than 120° C. is said to be stable at high temperatures in the context of the present invention. Continuously means that a membrane according to the present invention can be operated at least 100 hours, preferably at least 500 hours at least at 120° C., preferably at least at 160° C., without the performance, which can be measured by the method described in WO 01/18894 A2, decreasing by more than 50%, based on the initial performance.

The polymers used in step A) are preferably polymers, which have a glass transition temperature or Vicat softening temperature VST/A/50 of at least 100° C., preferably at least 150° C. and more particularly preferably at least 180° C.

Polymers containing at least one nitrogen atom in a repeat unit are particularly preferred. In particular, polymers containing at least one aromatic ring with at least one nitrogen heteroatom per repeat unit are preferred. Within this group, polymers based on polyazoles are particularly preferred. These basic polyazole polymers contain at least one aromatic ring with at least one nitrogen heteroatom per repeat unit.

The aromatic ring is preferably a five or six membered ring with one to three nitrogen atoms, which may be anellated with a further ring, in particular a further aromatic ring.

Polymers based on polyazole contain repeat azole units of general formula (I) and/or (II) and/or (III) and/or (IV) and/or (V) and/or (VI) and/or (VII) and/or (VIII) and/or (IX) and/or (X) and/or (XI) and/or (XII) and/or (XIII) and/or (XIV) and/or (XV) and/or (XVI) and/or (XVI) and/or (XVII) and/or (XVIII) and/or (XIX) and/or (XX) and/or (XXI) and/or (XXII)

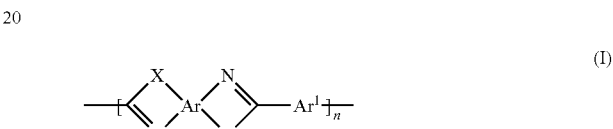

(I)

(II)

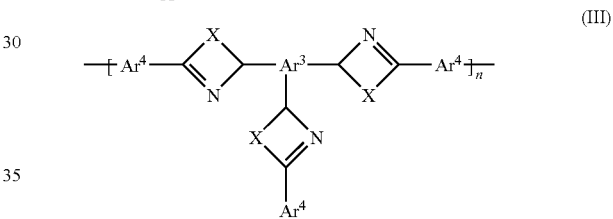

(III)

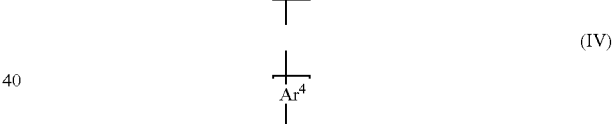

(IV)

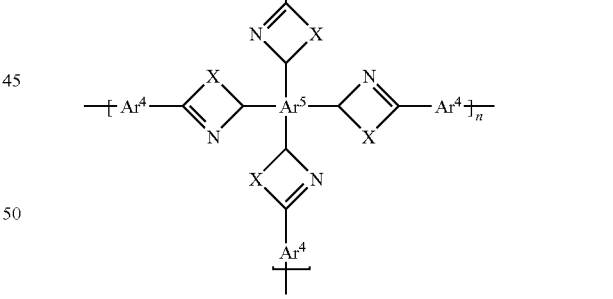

(V)

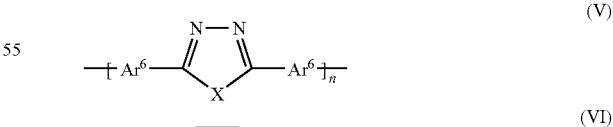

(VI)

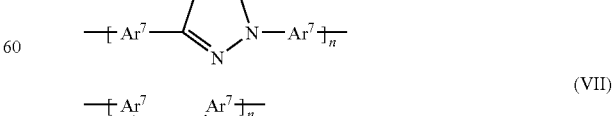

(VII)

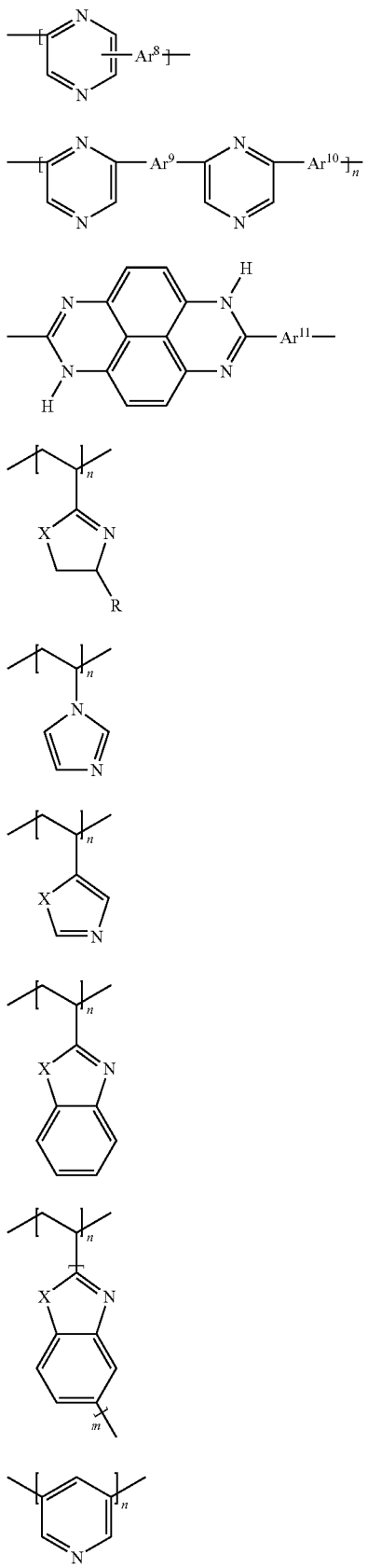
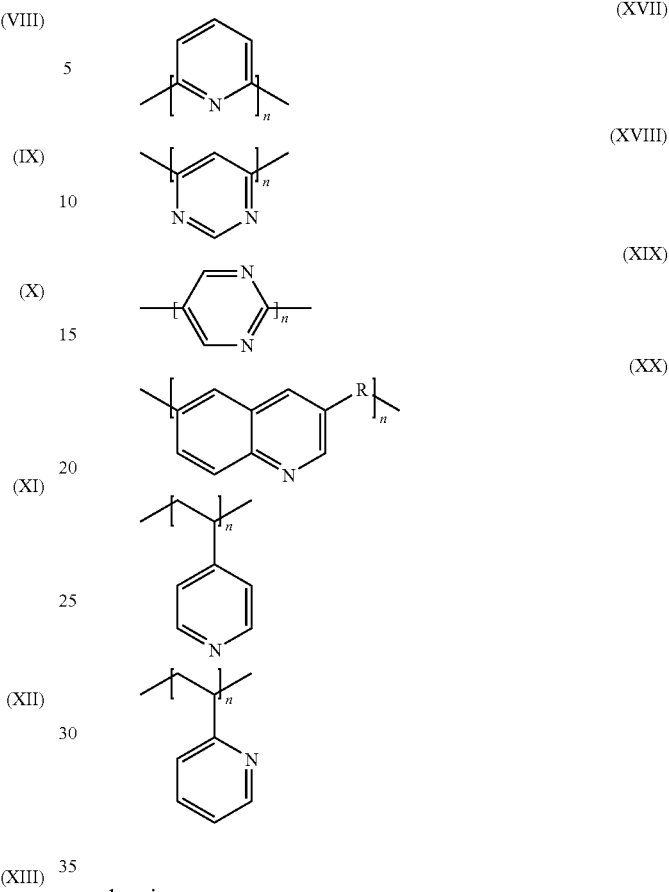

wherein
- Ar are the same or different and represent a quadrivalent aromatic or heteroaromatic group, which may be mononuclear or polynuclear,
- $Ar^1$ are the same or different and represent a divalent aromatic or heteroaromatic group, which may be mononuclear or polynuclear,
- $Ar^2$ are the same or different and represent a divalent or trivalent aromatic or heteroaromatic group, which may be mononuclear or polynuclear,
- $Ar^3$ are the same or different and represent a trivalent aromatic or heteroaromatic group, which may be mononuclear or polynuclear,
- $Ar^4$ are the same or different and represent a trivalent aromatic or heteroaromatic group, which may be mononuclear or polynuclear,
- $Ar^5$ are the same or different and represent a quadrivalent aromatic or heteroaromatic group, which may be mononuclear or polynuclear,
- $Ar^6$ are the same or different and represent a divalent aromatic or heteroaromatic group, which may be mononuclear or polynuclear,
- $Ar^7$ are the same or different and represent a divalent aromatic or heteroaromatic group, which may be mononuclear or polynuclear,
- $Ar^8$ are the same or different and represent a trivalent aromatic or heteroaromatic group, which may be mononuclear or polynuclear,
- $Ar^9$ are the same or different and represent a di- or tri- or quadrivalent aromatic or heteroaromatic group, which may be mononuclear or polynuclear, $Ar^{10}$ are the same or different and represent a divalent or trivalent aromatic or heteroaromatic group, which may be mononuclear or polynuclear, $Ar^{11}$ are the same or different and represent a divalent aromatic or heteroaromatic group, which may be mononuclear or polynuclear, X is the same or different and represents oxygen, sulphur or an amino group, which carries a hydrogen atom, a group containing 1 to 20 carbon atoms, preferably a branched or unbranched alkyl or alkoxy group, or an aryl group as a further radical R is the same or different and represents hydrogen, an alkyl group and an aromatic group and n, m is an integer greater than 10, preferably greater than 100.

Aromatic or heteroaromatic groups which are preferred according to the invention are derived from benzene, naphthalene, biphenyl, diphenylether, diphenylmethane, diphenyidimethylmethane, bisphenone, diphenylsulphone, thiophene, furan, pyrrole, thiazole, oxazole, imidazole, isothiazole, isoxazole, pyrazole, 1,3,4-oxadiazole, 2,5-diphenyl-1,3,4-oxadiazole, 1,3,4-thiadiazole, 1,3,4-triazole, 2,5-diphenyl-1,3,4-triazole, 1,2,5-triphenyl-1,3,4-triazole, 1,2,4-oxadiazole, 1,2,4-thiadiazole, 1,2,4-triazole, 1,2,3-triazole, 1,2,3,4-tetrazole, benzo[b]thiophene, benzo[b]furan, indole, benzo[c]thiophene, benzo[c]furan, isoindole, benzoxazole, benzothiazole, benzimidazole, benzisoxazole, benzisothiazole, benzopyrazole, benzothiadiazole, benzotriazole, dibenzofuran, dibenzothiophene, carbazole, pyridine, bipyridine, pyrazine, pyrazole, pyrimidine, pyridazine, 1,3,5-triazine, 1,2,4-triazine, 1,2,4,5-triazine, tetrazine, quinoline, isoquinoline, quinoxaline, quinazolein, cinnoline, 1,8-naphthyridine, 1,5-naphthyridine, 1,6-naphthyridine, 1,7-naphthyridine, phthalazine, pyridopyrimidine, purine, pteridine or quinolizine, 4H-quinolizine, diphenylether, anthracene, benzopyrrole, benzooxathiadiazole, benzooxadiazole, benzopyridine, benzopyrazine, benzopyrazidine, benzopyrimidine, benzotriazine, indolizine, pyridopyridine, imidazopyrimidine, pyrazinopyrimidine, carbazole, aciridine, phenazine, benzoquinoline, phenoxazine, phenothiazine, acridizine, benzopteridine, phenanthroline and phenanthrene, which may optionally also be substituted.

The substitution pattern of $Ar^1$, $Ar^4$, $Ar^6$, $Ar^7$, $Ar^8$, $Ar^9$, $Ar^{10}$, $Ar^{11}$ is optional; in the case of phenylene, for example, $Ar^1$, $Ar^4$, $Ar^6$, $Ar^7$, $Ar^8$, $Ar^9$, $Ar^{10}$, $Ar^{11}$ may be ortho-, meta- and para-phenylene. Particularly preferred groups are derived from benzene and biphenylene, which may optionally also be substituted.

Preferred alkyl groups include short-chained alkyl groups containing 1 to 4 carbon atoms, for example, methyl, ethyl, n- or i-propyl and t-butyl groups.

Preferred aromatic groups include phenyl or naphthyl groups. The alkyl groups and the aromatic groups may be substituted.

Preferred substituents include halogen atoms, for example, fluorine, amino groups, hydroxy groups or short-chained alkyl groups, for example, methyl or ethyl groups.

Polyazoles with repeat units of formula (I) in which the radicals X within a repeat unit are identical are preferred.

The polyazoles can basically also contain different repeat units, of which, for example, the radical X differs. Preferably, however, it only contains identical radicals in a repeat unit.

In a further embodiment of the present invention, the polymer containing repeat azole units is a copolymer or a blend, which contains at least two units of formulae (I) to (XXII) that differ from one another. The polymers may be in the form of block copolymers (diblock, triblock), random copolymers, periodic copolymers and/or alternating polymers.

The number of repeat azole units in the polymer is preferably an integer greater than 10. Particularly preferred polymers contain at least 100 repeat azole units.

Polymers containing repeat benzimidazole units are preferred in the context of the present invention. The following formulae show examples of the most expedient polymers containing repeat benzimidazole units:

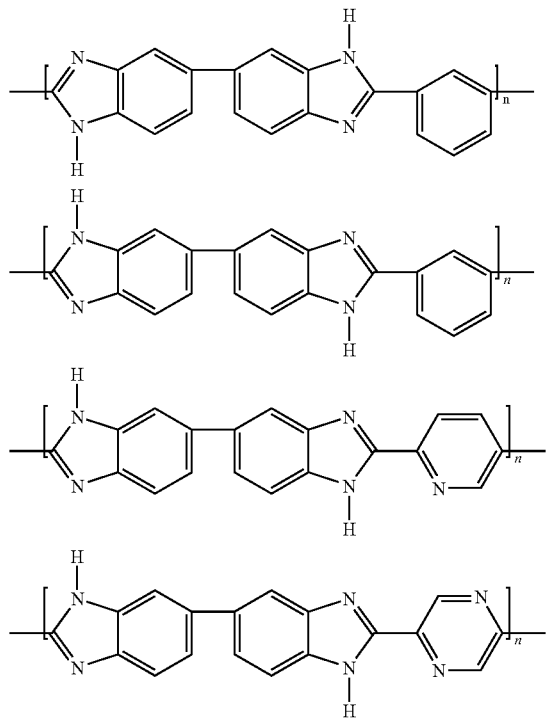
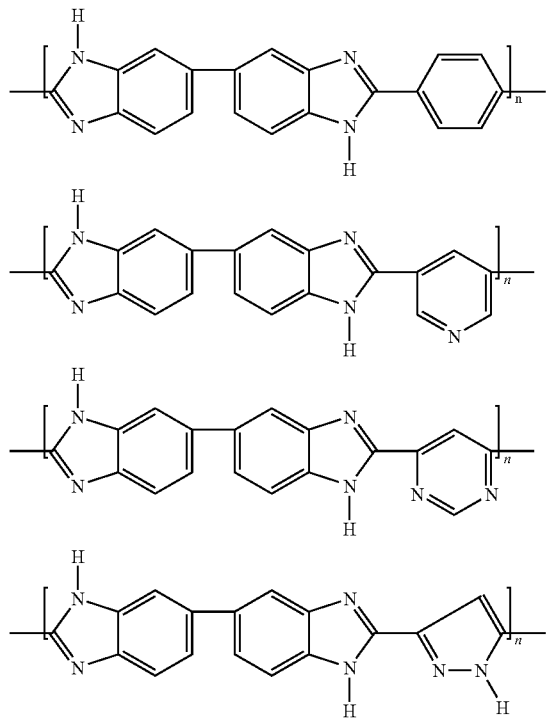

-continued
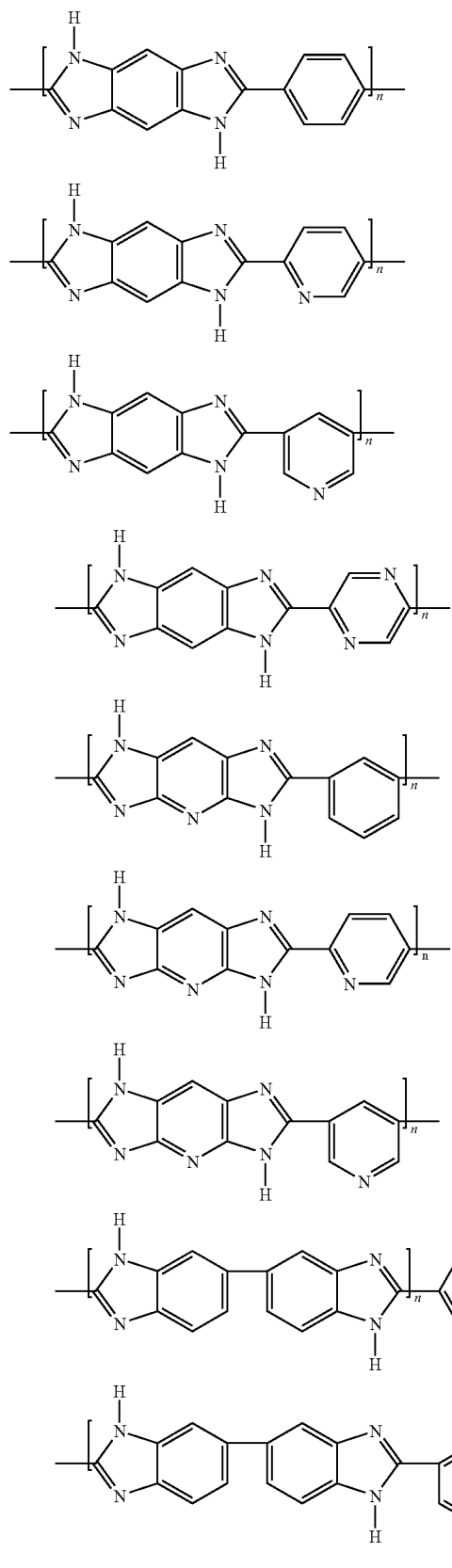
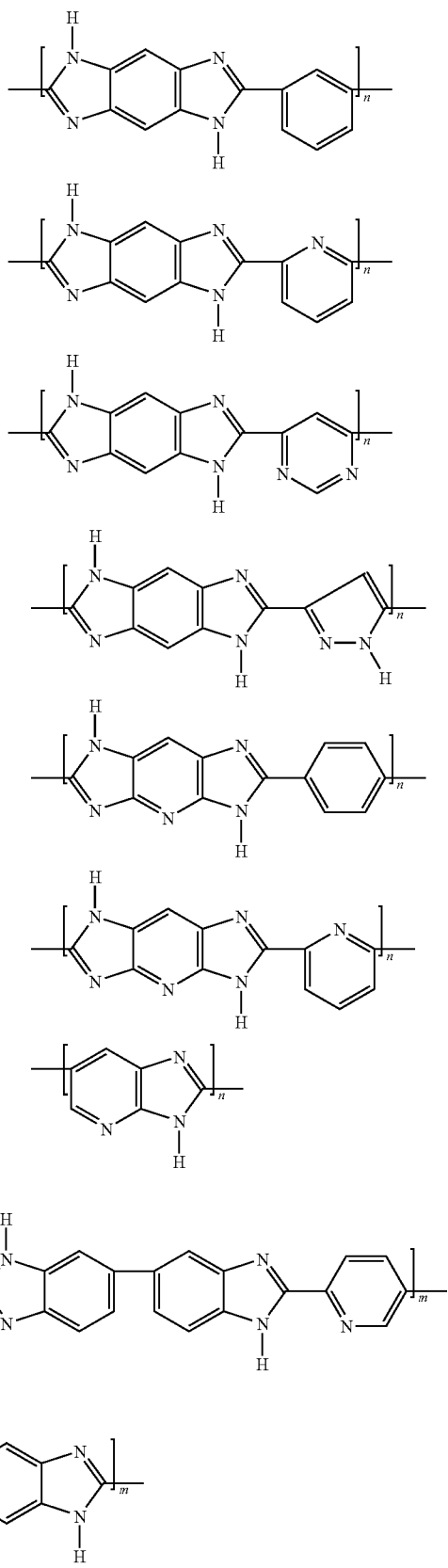

wherein n and m are an integer greater than 10, preferably greater than 100.

The polyazoles used in step A), but in particular the polybenzimidazoles, are distinguished by a high molecular weight. Measured as the intrinsic viscosity, this is preferably at least 0.2 dl/g, in particular 0.8 to 10 dl/g, particularly preferably 1 to 5 dl/g.

Further preferred polyazole polymers include polyimidazoles, polybenzthiazoles, polybenzoxazoles, polytriazoles, polyoxadiazoles, polythiadiazoles, polypyrazoles, polyquinoxalines, poly(pyridine), poly(pyrimidine) and poly(tetrazapyrene).

Celazole made by Celanese is particularly preferred, in particular one in which the polymer described in German Patent Application No. 10129458.1 and worked up by sieves is used.

In addition, polyazoles that have been obtained by the methods described in German Patent Application No. 101 17687.2 are preferred.

The preferred polymers include polysulphones, in particular polysulphone with aromatic and/or heteroaromatic groups in the main chain. According to a particular aspect of the present invention, preferred polysulphones and polyethersulphones have a melt volume rate MVR 300/21,6 of less than or equal to 40 cm$^3$/10 min, in particular less than or equal to 30 cm$^3$/10 min and particularly preferably less than or equal to 20 cm$^3$/10 min measured to ISO 1133. Polysulphones with a Vicat softening temperature VST/A/50 of 180° C. to 230° C. are preferred. In a further preferred embodiment of the present invention, the numerical average of the molecular weight of the polysulphones is greater than 30,000 g/mol.

The polymers based on polysulphone include, in particular, polymers containing repeat units with bonding sulphone groups according to general formulae A, B, C, D, E, F and/or G:

(A)

(B)

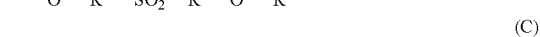
(C)

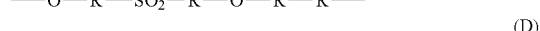
(D)

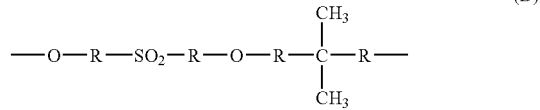
(E)

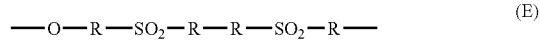
(F)

(G)

wherein the radicals R, independently of one another, are the same or different and represent an aromatic or heteroaromatic group, these radicals having been described in detail hereinbefore. They include, in particular, 1,2-phenylene, 1,3-phenylene, 1,4-phenylene, 4,4'-biphenyl, pyridine, quinoline, naphthalene, phenanthrene.

Polysulphones which are preferred in the context of the present invention include homo- and copolymers, for example random copolymers. Particularly preferred polysulphones comprise repeat units of formulae H to N:

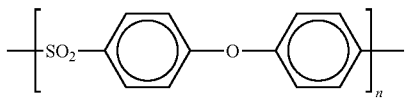
(H)

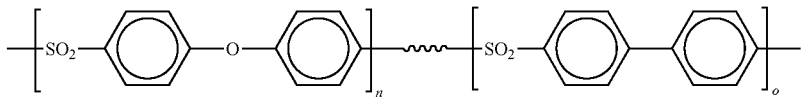
(I)

where n>o

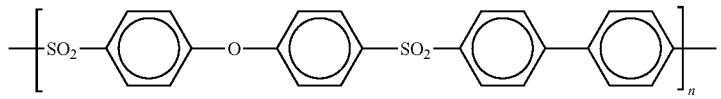
(J)

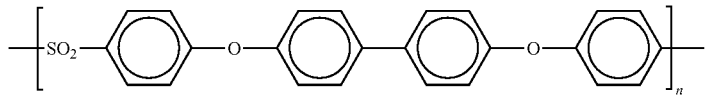
(K)

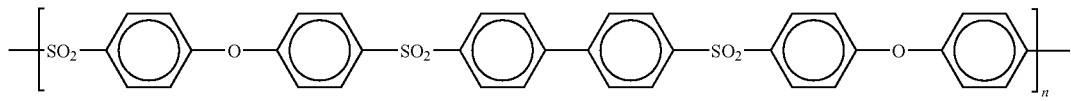
(L)

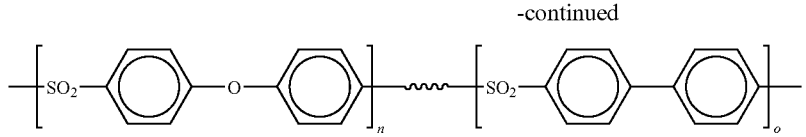

(M)

where n<o

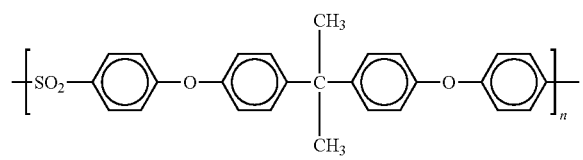

(N)

The above-described polysulphones are commercially available under the trade names ®Victrex 200 p, ®Victrex 720 p, ®Ultrason E, ®Ultrason S, ®Mindel, ®Radel A, ®Radel R, ®Victrex HTA, ®Astrel and ®Udel.

Polyetherketones, polyetherketoneketones, polyetheretherketones, polyetheretherketoneketones and polyarylketones are particularly preferred. These high-performance polymers are known per se and are commercially available under the trade names Victrex® PEEK™, ®Hostatec, ®Kadel.

The aforementioned polymers may be used individually or as a mixture (blend). In particular, blends which contain polyazoles and/or polysulphones are preferred. The mechanical properties can be improved and the material costs reduced by the use of blends.

In addition, the polymer film can exhibit further modifications, for example by crosslinking, as in German Patent Application No. 10110752.8 or in WO 00/44816. In a preferred embodiment, the polymer film used for swelling comprising a basic polymer and at least one blend component additionally contains a crosslinking agent, as described in German Patent Application No. 10140147.7.

It is also advantageous if the polymer film used for swelling is pretreated, as described in German Patent Application No. 10109829.4. This variant is advantageous for enhancing swelling of the polymer film.

Instead of the polymer films produced by conventional processes, polyazole-containing polymer membranes, as described in German Patent Application Nos. 10117686.4, 10144815.5, 10117687.2, may be used. For this purpose, these membranes are freed from the polyphoshoric acid and/or phosphoric acid and introduced in step A).

The polymer membrane according to the invention can also contain further additives to fillers and/or auxiliaries.

To further improve the properties in terms of application technology, fillers, in particular proton-conducting fillers, and additional acids may also be added to the membrane. The addition may be made, for example, in step A). Furthermore, these additives may also be added after polymerisation according to step B) if they are in liquid form.

Non-limiting examples of proton-conducting fillers include sulphates such as $CsHSO_4$, $Fe(SO_4)_2$, $(NH_4)_3H(SO_4)_2$, $LiHSO_4$, $NaHSO_4$, $KHSO_4$, $RbSO_4$, $LiN_2H_5SO_4$, $NH_4HSO_4$, phosphates such as $Zr_3(PO_4)_4$, $Zr(HPO_4)_2$, $HZr_2(PO_4)_3$, $UO_2PO_4 \cdot 3H_2O$, $H_8UO_2PO_4$, $Ce(HPO_4)_2$, $Ti(HPO_4)_2$, $KH_2PO_4$, $NaH_2PO_4$, $LiH_2PO_4$, $NH_4H_2PO_4$, $CsH_2PO_4$, $CaHPO_4$, $MgHPO_4$, $HSbP_2O_8$, $HSb_3P_2O_{14}$, $H_5Sb_5P_2O_{20}$, polyacid such as $H_3PW_{12}O_{40} \cdot nH_2O$ (n=21-29), $H_3SiW_{12}O_{40} \cdot nH_2O$ (n=21-29), $H_xWO_3$, $HSbWO_6$, $H_3PMo_{12}O_{40}$, $H_2Sb_4O_{11}$, $HTaWO_6$, $HNbO_3$, $HTiNbO_5$, $HTiTaO_5$, $HSbTeO_6$, $H_5Ti_4O_9$, $HSbO_3$, $H_2MoO_4$ selenites and arsenides such as $(NH_4)_3H(SeO_4)_2$, $UO_2AsO_4$, $(NH_4)_3H(SeO_4)_2$, $KH_2AsO_4$, $Cs_3H(SeO_4)_2$, $Rb_3H(SeO_4)_2$, oxides such as $Al_2O_3$, $Sb_2O_5$, $ThO_2$, $SnO_2$, $ZrO_2$, $MoO_3$ silicates such as zeolites, zeolites ($NH_4+$), sheet silicates, tectosilicates, H-natrolites, H-mordenites, $NH_4$-analcines, $NH_4$-sodalites, $NH_4$-gallates, H-montmorillonites acids such as $HClO_4$, $SbF_5$ fillers such as carbides, in particular SiC, $Si_3N_4$, fibres, in particular glass fibres, powdered glass and/or polymer fibres, preferably based on polyazoles.

These additives may be contained in conventional amounts in the polymer membrane, but the positive properties such as high conductivity, long service life and high mechanical strength of the membrane must not be adversely affected by excessive amounts of additives. In general, the membrane comprises at most 80% by weight, preferably at most 50% by weight and particularly preferably at most 20% by weight of additives after polymerisation in step B).

Furthermore, this membrane may also contain perfluorinated sulphonic acid additives (preferably 0.1-20% by weight, more preferably 0.2-15% by weight, and particularly preferably 0.2-10% by weight). These additives improve performance, enhance oxygen solubility and oxygen diffusion in the cathode region and reduce phosphoric acid and phosphate adsorption to platinum. (Electrolyte additives for phosphoric acid fuel cells. Gang, Xiao; Hjuler, H. A.; Olsen, C.; Berg, R. W.; Bjerrum, N. J. Chem. Dep. A, Tech. Univ. Denmark, Lyngby, Den. J. Electrochem. Soc. (1993), 140(4), 896-902 and perfluorosulphoneimide as an additive in phosphoric acid fuel cell. Razaq, M.; Razaq, A.; Yeager, E.; DesMarteau, Darryl D.; Singh, S. Case Cent. Electrochem. Sci., Case West. Reserve Univ., Cleveland, Ohio, USA. J. Electrochem. Soc. (1989), 136(2), 385-90.)

Non-limiting examples of persulphonated additives include:

trifluoromethane sulphonic acid, potassium trifluoromethane sulphonate, sodium trifluoromethane sulphonate, lithium trifluoromethane sulphonate, ammonium trifluoromethane sulphonate, potassium perfluorohexane sulphonate, sodium perfluorohexane sulphonate, lithium perfluorohexane sulphonate, ammonium perfluorohexane sulphonate, perfluorohexane sulphonic acid, potassium nonafluorobutane sulphonate, sodium nonafluorobutane sulphonate, lithium nonafluorobutane sulphonate, ammonium nonafluorobutane sulphonate, caesium nonafluorobutane sulphonate, triethylammonium perfluorohexasulphonate and perfluorosulphoimides.

Vinyl-containing phosphonic acids are known to the person skilled in the art. They are compounds which comprise at least one carbon-carbon double bond and at least one phosphonic acid group. Preferably, the two carbon atoms, which form the carbon-carbon double bond comprise at least two, preferably three bonds to groups that lead to minimal steric hindrance of the double bond. These groups include inter alia hydrogen atoms and halogen atom, in particular fluorine atoms. In the context of the present invention, the polyvinylphosphonic acid is obtained from the polymerisation product obtained by polymerisation of the vinyl-containing phosphonic acid alone or with further monomers and/or crosslinking agents.

The vinyl-containing sulphonic acid may comprise one, two, three or more carbon-carbon-double bonds. Furthermore, the vinyl-containing sulphonic acid may contain one, two, three or more sulphonic acid groups.

In general, the vinyl-containing sulphonic acid contains 2 to 20, preferably 2 to 10 carbon atoms.

The vinyl-containing sulphonic acid used in step A) is preferably a compound of the formula

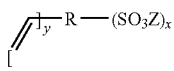

wherein
R represents a bond, a C1-C15-alkyl group, C1-C15-alkoxy group, ethyleneoxy group or C5-C20-aryl or heteroaryl group, in which the aforementioned radicals may in turn be substituted by halogen, —OH, COOZ, —CN, $NZ_2$,
Z represents, independently of one another, hydrogen, C1-C15-alkyl group, C1-C15-alkoxy group, ethyleneoxy group or C5-C20-aryl or heteroaryl group, in which the aforementioned radicals may in turn be substituted by halogen, —OH, —CN, and
x represents an integer 1, 2, 3, 4, 5, 6, 7, 8, 9 or 10
y represents an integer 1, 2, 3, 4, 5, 6, 7, 8, 9 or 10 and/or of the formula

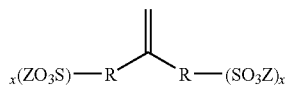

wherein
R represents a bond, a C1-C15-alkyl group, C1-C15-alkoxy group, ethyleneoxy group or C5-C20-aryl or heteroaryl group, in which the aforementioned radicals may in turn be substituted by halogen, —OH, COOZ, —CN, $NZ_2$,
Z represents, independently of one another, hydrogen, C1-C15-alkyl group, C1-C15-alkoxy group, ethyleneoxy group or C5-C20-aryl or heteroaryl group, in which the aforementioned radicals may in turn be substituted by halogen, —OH, —CN, and
x represents an integer 1, 2, 3, 4, 5, 6, 7, 8, 9 or 10 and/or of the formula

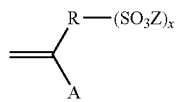

wherein
A represents a group of the formulae $COOR^2$, CN, $CONR^2_2$, $OR^2$ and/or $R^2$,
wherein $R^2$ represents hydrogen, a C1-C15-alkyl group, C1-C15-alkoxy group, ethyleneoxy group or C5-C20-aryl or heteroaryl group bedeutet, in which the aforementioned radicals may in turn be substituted by halogen, —OH, COOZ, —CN, $NZ_2$
R represents a bond, a divalent C1-C15-alkylene group, divalent C1-C15-alkyleneoxy group, for example ethyleneoxy group or divalent C5-C20-aryl or heteroaryl group, in which the aforementioned radicals may in turn be substituted by halogen, —OH, COOZ, —CN, $NZ_2$,
Z represents, independently of one another, hydrogen, C1-C15-alkyl group, C1-C15-alkoxy group, ethyleneoxy group or C5-C20-aryl or heteroaryl group, in which the aforementioned radicals may in turn be substituted by halogen, —OH, —CN, and
x represents an integer 1, 2, 3, 4, 5, 6, 7, 8, 9 or 10.

Preferred vinyl-containing sulphonic acids include alkenes that contain sulphonic acid groups, such as ethenesulphonic acid, propenesulphonic acid, butenesulphonic acid; acrylic acid and/or methacrylic acid compounds, that contain sulphonic acid groups, such as for example 2-sulphomethyl-acrylic acid, 2-sulphomethyl-methacrylic acid, 2-sulphomethyl-acrylic acid amide and 2-sulphomethyl-methacrylic acid amide.

Conventional commercial vinylsulphonic acid (ethene sulphonic acid) of the type available, for example, from Aldrich or Clariant GmbH is particularly preferably used. A preferred vinylsulphonic acid has purity of more than 70%, in particular 90% and particularly preferably more than 97% purity.

The vinyl-containing sulphonic acids may further be used in the form of derivatives, which may then be converted into the acid, conversion to the acid also being able to take place in the polymerised state. These derivatives include, in particular, the salts, the esters, the amides and the halides of vinyl-containing sulphonic acids.

The swollen polymer film produced in step A), after swelling, preferably contains at least 1% by weight, in particular at least 10% by weight and particularly preferably at least 30% by weight, based on the total weight, of vinyl-containing sulphonic acid. According to a particular aspect of the present invention, the swollen polymer film produced in step A) contains at most 60% by weight, in particular at most 50% by weight, of polymer film and particularly preferably at most 30% by weight of polymer film, based on the total weight. This value may be determined from the increase in weight caused by swelling.

According to a particular embodiment of the present invention, the mixture according to step A) comprises vinyl-containing phosphonic acids. The high temperature properties of the membrane can surprisingly be enhanced by the addition of vinyl-containing phosphonic acid. A membrane according to the invention may even be briefly operated with a relatively small introduction of these phosphonic acids without humidification, without the membrane thus being destroyed. If the content of vinyl-containing phosphonic acid is increased, the efficiency increases as the temperature rises, this efficiency also being achieved with humidification.

The polyvinylphosphonic acid, which is contained in the membrane and may also be crosslinked by reactive groups, forms an interpenetrating network with the polymer which is stable at high temperatures. Washing out of the electrolyte by the product water formed or, in the case of a DMFC, by the aqueous fuel is significantly reduced. A polymer electrolyte membrane according to the invention has very low methanol permeability and is suitable, in particular, for use in a DMFC. Continuous operation of a fuel cell with a plurality of fuels, such as hydrogen, natural gas, petrol, methanol or biomass, is therefore possible. The membranes allow particularly high activity of these fuels. At high temperatures, methanol oxidation can take place with high activity. In a particular embodiment, these membranes are suitable for operation in what is known as vaporous DMFC, in particular at temperatures in the range of 100 to 200° C.

The sensitivity of the Pt catalyst to gaseous impurities, in particular CO, decreases markedly, owing to the possibility of operating at temperatures above 100° C. CO is formed as a by-product during reforming of the hydrogen-rich gas from carbon-containing compounds such as natural gas, methanol or petrol or also as an intermediate produce during direct oxidation of methanol. The CO content of the fuel may typically be more than 5000 ppm at temperatures above 120° C., without the catalytic effect of the Pt catalyst being drastically reduced. At temperatures in the range of 150-200°, however, 10000 ppm CO or more can even be tolerated (N. J. Bjerrum et. al. Journal of Applied Electrochemistry, 2001, 31, 773-779). This considerably simplifies the preceding reforming process and there reduces the cost of the entire fuel cell system.

A membrane according to the invention with a high phosphonic acid content has high conductivity, which is also achieved without humidification, over a large temperature range. Furthermore, a fuel cell equipped with a membrane according to the invention may also be operated at low temperatures, for example at 5° C. with humidification, if the sulphonic acid content is relatively high.

Vinyl-containing phosphonic acids are known to the person skilled in the art. They are compounds which comprise at least one carbon-carbon double bond and at least one phosphonic acid group. Preferably, the two carbon atoms, which form the carbon-carbon double bond, comprise at least two, preferably three bonds to groups that lead to minimal steric hindrance of the double bond. These groups include inter alia hydrogen atoms and halogen atoms, in particular fluorine atoms. In the context of the present invention, the polyvinylphosphonic acid is obtained from the polymerisation product obtained by polymerisation of the vinyl-containing phosphonic acid alone or with further monomers and/or crosslinking agents.

The vinyl-containing phosphonic acid may comprise one, two, three or more carbon-carbon-double bonds. Furthermore, the vinyl-containing phosphonic acid may contain one, two, three or more phosphonic acid groups.

In general, the vinyl-containing phosphonic acid contains 2 to 20, preferably 2 to 10, carbon atoms.

The vinyl-containing phosphonic acid used in step A) is preferably a compound of the formula

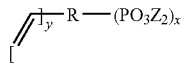

wherein
R represents a bond, a C1-C15 alkyl group, C1-C15 alkoxy group, ethyleneoxy group or C5-C20 aryl or heteroaryl group, in which the aforementioned radicals may in turn be substituted by halogen, —OH, COOZ, —CN, NZ$_2$,
Z represents, independently of one another, hydrogen, C1-C15 alkyl group, C1-C15 alkoxy group, ethyleneoxy group or C5-C20 aryl or heteroaryl group, in which the aforementioned radicals may in turn be substituted by halogen, —OH, —CN, and
x represents an integer 1, 2, 3, 4, 5, 6, 7, 8, 9 or 10
y represents an integer 1, 2, 3, 4, 5, 6, 7, 8, 9 or 10 and/or of the formula

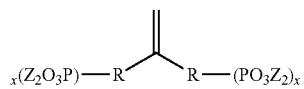

wherein
R represents a bond, a C1-C15 alkyl group, C1-C15 alkoxy group, ethyleneoxy group or C5-C20 aryl or heteroaryl group, in which the aforementioned radicals may in turn be substituted by halogen, —OH, COOZ, —CN, NZ$_2$,
Z represents, independently of one another, hydrogen, C1-C15 alkyl group, C1-C15 alkoxy group, ethyleneoxy group or C5-C20 aryl or heteroaryl group, in which the aforementioned radicals may in turn be substituted by halogen, —OH, —CN, and
x represents an integer 1, 2, 3, 4, 5, 6, 7, 8, 9 or 10 and/or of the formula

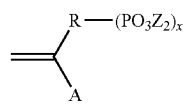

wherein
A represents a group of the formulae COOR$^2$, CN, CONR$^2_2$, OR$^2$ and/or R$^2$,
wherein R$^2$ represents hydrogen, a C1-C15 alkyl group, C1-C15 alkoxy group, ethyleneoxy group or C5-C20 aryl or heteroaryl group, in which the aforementioned radicals may in turn be substituted by halogen, —OH, COOZ, —CN, NZ$_2$
R represents a bond, a divalent C1-C15 alkylene group, divalent C1-C15 alkyleneoxy group, for example ethyleneoxy group or divalent C5-C20 aryl or heteroaryl group, in which the aforementioned radicals may in turn be substituted by halogen, —OH, COOZ, —CN, NZ$_2$,
Z represents, independently of one another, hydrogen, C1-C15 alkyl group, C1-C15 alkoxy group, ethyleneoxy group or C5-C20 aryl or heteroaryl group, in which the aforementioned radicals may in turn be substituted by halogen, —OH, —CN, and
x represents an integer 1, 2, 3, 4, 5, 6, 7, 8, 9 or 10.

Preferred vinyl-containing phosphonic acids include inter alia alkenes that contain phosphonic acid groups, such as ethenephosphonic acid, propenephosphonic acid, butenephosphonic acid; acrylic acid and/or methacrylic acid compounds, that contain phosphonic acid groups, such as for example 2-phosphomethyl-acrylic acid, 2-phosphomethyl-methacrylic acid, 2-phosphomethyl-acrylic acid amide and 2-phosphomethyl-methacrylic acid amide.

Conventional commercial vinylphosphonic acid (ethene phosphonic acid) of the type available, for example, from Aldrich or Clariant GmbH is particularly preferably used. A preferred vinylphosphonic acid has purity of more than 70%, in particular 90% and particularly preferably more than 97% purity.

The vinyl-containing phosphonic acids may further be used in the form of derivatives, which may then be converted into the acid, conversion to the acid also being able to take place in the polymerised state. These derivatives include, in particular, the salts, the esters, the amides and the halides of vinyl-containing phosphonic acids.

The use of vinyl-containing phosphonic acid is optional. The liquid used for swelling in step A) preferably comprises at least 20% by weight, in particular at least 30% by weight and particularly preferably at least 50% by weight, based on the total weight of the liquid, of vinyl-containing phosphonic acid.

The liquid used for swelling in step A) may additionally contain further organic and/or inorganic solvents. Organic solvents include, in particular, polar aprotic solvents such as dimethyl sulphoxide (DMSO), esters, such as ethylacetate, and polar protic solvents, such as alcohols, such as ethanol, propanol, isopropanol and/or butanol. Inorganic solvents include, in particular, water, phosphoric acid and polyphosphoric acid.

These may be beneficial to processing. In particular, the solubility of the polymer may be improved by adding the organic solvent. The vinyl-containing sulphonic acid content in such solutions is generally at least 5% by weight, preferably at least 10% by weight, particularly preferably between 10 and 97% by weight. The vinyl-containing phosphonic acid content in such solutions is preferably at least 5% by weight, more preferably at least 10% by weight, particularly preferably between 10 and 97% by weight.

The ratio by weight of vinyl-containing phosphonic acid to vinyl-containing sulphonic acid may lie in broad ranges. Preferably, the ratio of vinyl-containing phosphonic acid to vinyl-containing sulphonic acid lies in the range of 1:100 to 99:1, in particular in the range of 1:10 to 10:1. With a ratio greater than or equal to 1:1, in particular greater than or equal to 3:1, particularly preferably greater than or equal to 5:1, the membrane may also be operated at temperatures higher than 100° C. without humidification.

In a further embodiment of the invention, the liquid comprising vinyl-containing sulphonic acid contains further monomers capable of crosslinking. These are, in particular, compounds that comprise at least 2 carbon-carbon double bonds. Dienes, trienes, tetraenes, dimethylacrylates, trimethylacrylates, tetramethylacrylates, diacrylates, triacrylates, tetraacrylates are preferred.

Particularly preferred are dienes, trienes, tetraenes of the formula

dimethylacrylates, trimethylcrylates, tetramethylacrylates of the formula

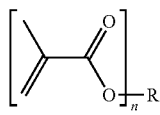

diacrylates, triacrylates, tetraacrylates of the formula

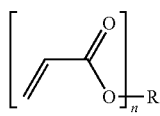

wherein
R represents a C1-C15 alkyl group, C5-C20 aryl or heteroaryl group, NR', —SO$_2$, PR', Si(R')$_2$, wherein the aforementioned radicals may in turn be substituted
R' represents, independently of one another, hydrogen, a C1-C15 alkyl group, C1-C15 alkoxy group, C5-C20 aryl or heteroaryl group and
n is at least 2.

The substituents of the aforementioned radical R are preferably halogen, hydroxyl, carboxy, carboxyl, carboxylester, nitrile, amine, silyl or siloxane radicals.

Particularly preferred crosslinking agents include allylmethacrylate, ethyleneglycoldimethacrylate, diethyleneglycoldimethacrylate, triethyleneglycoldimethacrylate, tetra- and polyethyleneglycoldimethacrylate, 1,3-butanedioldimethacrylate, glycerinedimethacrylate, diurethanedimethacrylate, trimethylpropanetrimethacrylate, epoxyacrylate, for example ebacryl, N',N-methylenebisacrylamide, carbinol, butadiene, isoprene, chloroprene, divinylbenzene and/or bisphenol-A-dimethylacrylate. These compounds are commercially available by the names CN-120, CN104 and CN-980, for example from Sartomer Company Exton, Pa.

The use of crosslinking agents is optional, and these compounds may usually be used in the range between 0.05 and 30% by weight, preferably 0.1 and 20% by weight, particularly preferably 1 and 10% by weight, based on the weight of vinyl-containing sulphonic acid and optionally vinyl-containing phosphonic acid.

The liquid comprising vinyl-containing sulphonic acid may be a solution and may also contain suspended and/or dispersed constituents. The viscosity of the liquid comprising vinyl-containing sulphonic acid may lie in broad ranges, an addition of solvents or a rise in temperature being effected to adjust the viscosity. The dynamic viscosity preferably lies in the range of 0.1 to 10000 mPa·s, in particular 0.2 to 2000 mPa·s, these values being measurable, for example in accordance with DIN 53015.

The swelling of the film in step A) preferably takes place at temperatures above 0° C., particularly preferably between ambient temperature (20° C.) and 160° C. The swelling can basically also take place at lower temperatures, but the period of time required for swelling is increased and the cost effectiveness reduced. At excessively high temperatures, the film used for swelling may be damaged. The duration of swelling is dependent on the selected temperature. The duration of treatment should be selected such that the desired swelling is achieved.

Polymerisation of the vinyl-containing sulphonic acid and optionally vinyl-containing phosphonic acid in step C) preferably takes place radically. The radicals may be formed thermally, photochemically, chemically and/or electrochemically.

For example, an initiator solution, which contains at least one substance capable of forming radicals, may be added to the liquid according to step A). Furthermore, an initiator solution may be applied to the swollen sheet. This may be carried out by known methods (for example, spraying, immersion, etc.), which are known from the prior art.

Suitable radical formers include inter alia azo compounds, peroxy compounds, persulphate compounds or azoamidines. Non-limiting examples include dibenzoylperoxide, dicumeneperoxide, cumeneperoxide, diisopropylperoxydicarbonate, bis(4-t-butylcyclohexyl)peroxydicarbonate, dipotassiumpersulphate, ammonium peroxydisulphate, 2,2'-azobis(2-methylpropionitrile) (AIBN), 2,2'-azobis-(isobutyric acid amidine)hydrochloride, benzopinacol, dibenzyl derivates, methylethyleneketoneperoxide, 1,1-azobiscyclohexancarbonitrile, methylethylketoneperoxide, acetylacetoneperoxide, dilaurylperoxide, didecanoylperoxide, tert.-butylper-2-ethylhexanoate, ketoneperoxide, methylisobutylketoneperoxide, cyclohexanoneperoxide, dibenzoylperoxide, tert.-butylperoxybenzoate, tert.-butylperoxyisopropylcarbonate, 2,5-bis (2-ethylhexanoyl-peroxy)-2,5-dimethylhexane, tert.-butylperoxy-2-ethyl hexanoate, tert.-butylperoxy-3,5,5-trimethylhexanoate, tert.-butylperoxyisobutyrate, tert.-butylperoxyacetate, dicumylperoxide, 1,1-bis(tert.-butylperoxy)cyclohexane, 1,1-bis(tert.-butylperoxy)3,3,5- trimethylcyclohexane, cumylhydroperoxide, tert.-butylhydroperoxide, bis(4-tert.-butylcyclohexyl) peroxydicarbonate, and the radical formers available by the name ®Vazo, for example ®Vazo V50 and ®Vazo WS, from Dupont.

Furthermore, radical formers which form radicals when irradiated may also be used. Preferred compounds include inter alia α,α-diethoxyacetophenone (DEAp, Upjon Corp), n-butylbenzoinether (®Trigonal-14, AKZO) and 2,2-dimethoxy-2-phenylacetophenone (®Igacure 651) and 1-benzoylcyclohexanol (®Igacure 184), bis(2,4,6-trimethylbenzoyl)-phenylphosphineoxide (®Irgacure 819) and 1-[4-(2-hydroxyethoxy)phenyl]-2-hydroxy-2-phenylpropan-1-one (®Irgacure 2959), which are each commercially available from Ciba Geigy Corp.

Between 0.0001 and 5% by weight, in particular 0.01 to 3% by weight (based on the sum of vinyl-containing sulphonic acid and optionally vinyl-containing phosphonic acid), of radical former are usually added. The amount of radical former may be varied, depending on the desired degree of polymerisation.

Polymerisation may also be carried out by the action of IR or NIR (IR=infrared, i.e. light with a wavelength of more than 700 nm; NIR=near IR, i.e. light with a wavelength in the range of approximately 700 to 2000 nm or energy in the range of approximately 0.6 to 1.75 eV).

Polymerisation may also be carried out by the action of UV-light with a wavelength of less than 400 nm. This method of polymerisation is known per se and described, for example, in Hans Joerg Elias, Makromolekulare Chemie, 5. Auflage, Vol. 1, p. 492-511; D. R. Arnold, N. C. Baird, J. R. Bolton, J. C. D. Brand, P. W. M Jacobs, P. de Mayo, W. R. Ware, Photochemisry—An Introduction, Academic Press, New York and M. K. Mishra, Radical Photopolymerization of Vinyl Monomers, J. Macromol. Sci.-Revs. Macromol. Chem. Phys. C22(1982-1983) 409.

Polymerisation may also be carried out by the action of β-, γ- and/or electron rays. According to a particular embodiment of the present invention, a membrane is irradiated with a radiation dose in the range of 1 to 300 kGy, preferably 3 to 200 kGy and more particularly preferably 20 to 100 kGy.

Polymerisation of the vinyl-containing sulphonic acid and optionally the vinyl-containing phosphonic acid in step B) is preferably carried out at temperatures above room temperature (20° C.) and below 200° C., in particular at temperatures between 40° C. and 150° C., particularly preferably between 50° C. and 120° C. Polymerisation preferably takes place under normal pressure, but may also take place under the action of pressure. Polymerisation leads to solidification of the swollen polymer film according to step A), and this solidification may be followed by microhardness measurement. Preferably the increase in the hardness due to polymerisation is at least 20%, based on the hardness of the polymer film swollen in step A).

According to a particular embodiment of the present invention the membranes have high mechanical strength. This value is derived from the hardness of the membrane determined in accordance with DIN 50539. For this purpose, the memrane is loaded with a Vickers diamond within 20 s in succession to a force of 3 mN and the depth of penetration is determined. The hardness at ambient temperature is accordingly at least 0.01 N/mm$^2$, preferably at least 0.1 N/mm$^2$ and more particularly preferably at least 1 N/mm$^2$, without being limited thereto. The force is then kept constant for 5 s at 3 mN, and the creep calculated from the depth of penetration. In preferred membranes, the creep $C_{HU}$ 0.003/20/5 is less than 20%, preferably less than 10% and more particularly preferably less than 5% under these conditions. The modulus determined by microhardness measurement YHU is at least 0.5 MPa, in particular at least 5 MPa and more particularly preferably at least 10 MPa, without being limited thereto.

Depending on the desired degree of polymerisation, the sheet obtained by swelling of the polymer film and subsequent polymerisation is a self-supporting membrane.

The degree of polymerisations is preferably at least 2, in particular at least 5, particularly preferably at least 30 repeat units, in particular at least 50 repeat units, more particularly preferably at least 100 repeat units. This degree of polymerisation is determined via the numerical average of the molecular weight $M_n$, which may be determined by GPC methods. Owing to the difficulty in isolating the polyvinylphosphonic acid contained in the membrane without decomposition, this value is determined by means of a sample by polymerisation of vinylphosphonic acid without solvent and without addition of polymer. The proportion by weight of vinylphosphonic acid and radical initiator is kept constant in comparison with the ratios after dissolution of the membrane. The conversion achieved during comparison polymerisation is preferably greater than or equal to 20%, in particular greater than or equal to 40% and particularly preferably greater than or equal to 75%, based on the vinyl-containing phosphonic acid used.

The polymer membrane according to the invention preferably contains between 1 and 90% by weight of the polymer and between 99 and 0.5% by weight of polyvinyl sulphonic acid. The polymer membrane according to the invention preferably contains between 3 and 85% by weight of the polymer and between 70 and 1% by weight of polyvinyl sulphonic acid, particularly preferably between 5 and 50% by weight of the polymer and between 50 and 5% by weight of polyvinyl sulphonic acid, based on the total weight of the polymer membrane in each case. The proportion of polyvinylphosphonic acid preferably lies in the range of 5 to 97% by weight, in particular in the range of 20 to 95% by weight, based on the total weight of the polymer membrane in each case. In addition, the polymer membrane according to the invention may also contain further fillers and/or auxiliaries.

After polymerisation according to step C) the membrane may be thermally, photochemically, chemically and/or electrochemically crosslinked at the surface. This hardening of the membrane surface additionally improves the properties of the membrane.

According to a particular aspect, the membrane may be heated to a temperature of at least 150° C., preferably at least 200° C. and particularly preferably at least 250° C. Thermal crosslinking is preferably carried out in the presence of oxygen. The oxygen concentration is usually in the range of 5 to 50% by volume, preferably 10 to 40% by volume during this step of the process, without being limited thereto.

Crosslinking may also be carried out the action of IR or NIR (IR=infrared, i.e. light with a wavelength of more than 700 nm; NIR=near IR, i.e. light with a wavelength in the range of approximately 700 to 2000 nm or energy in the range of approximately 0.6 to 1.75 eV) and/or UV-light. A further method is irradiation with β-, γ- and/or electron rays. The radiation dose is preferably between 5 and 200 kGy, in particular 10 to 100 kGy, in this case. Irradiation may be carried out in air or under inert gas. The performance characteristics of the membrane, in particular its durability, are hereby improved.

Depending on the desired degree of crosslinking, the duration of the crosslinking reaction may lie in a broad range. This reaction time generally lies in the range of 1 second to 10 hours, preferably 1 minute to 1 hour, without being limited thereto.

The polymer membrane according to the invention has better material properties than previously known doped polymer membranes. If the membranes according to the invention have a high proportion of polyvinylphosphonic acid, they have intrinsic conductivity in comparison to known undoped polymer membranes.

The intrinsic conductivity of the membrane according to the invention is generally at least 0.1 mS/cm, preferably at least 1 mS/cm, in particular at least 2 mS/cm and particularly preferably at least 5 mS/cm, at temperatures of 80° C., optionally with humidification.

With a proportion by weight of polyvinylphosphonic acid greater than 10%, based on the total weight of the membrane, the membranes generally exhibit conductivity at temperatures of 160° C. of at least 1 mS/cm, preferably at least 3 mS/cm, in particular at least 5 mS/cm and particularly preferably at least 10 mS/cm. These values are achieved without humidification.

The specific conductivity is measured by impedance spectroscopy in a 4-pole arrangement in the potentionstatic mode using platinum electrodes (0.25 mm diamter wire). The distance between the current collecting electrodes is 2 cm. The spectrum obtained is evaluated using a simple model consisting of a parallel arrangement of an ohmic resistor and a capacitor. The cross section of the sample of the phosphoric acid doped membrane is measured directly before assembly of the sample. To measure the temperature dependency, the test cell is brought to the desired temperature in an oven and regulated via a Pt-100 thermocouple placed in the immediate vicinity of the sample. After reaching the temperature, the sample is kept at this temperature for 10 minutes, before commencing measurement.

The polymer membrane according to the invention shows better material properties than formerly known doped polymer membranes. If the polymer membranes according to the invention comprise a high proportion of polyvinylphosphonic acid, they have intrinsic conductivity in comparison to known undoped polymer membranes.

The cross over current density is preferably less than 100 $mA/cm^2$, in particular less than 70 $mA/cm^2$, particularly preferably less than 50 $mA/cm^2$, and more particularly preferably less than 10 $mA/cm^2$, when operating with 0.5 M methanol solution and at 90° C. in what is known as a liquid direct methanol fuel cell. The cross over current density is preferably less than 100 $mA/cm^2$, in particular less than 50 $mA/cm^2$, more particularly preferably less than 10 $mA/cm^2$, when operating with a 2 M methanol solution and at 160° C. in what is known as a gaseous direct methanol fuel cell.

To determine the cross over current density, the amount of carbon dioxide released at the cathode is measured using a $CO_2$ sensor. The cross over current density is calculated from the value of the amount of $CO_2$ obtained, as described by P. Zelenay, S. C. Thomas, S. Gottesfeld in S. Gottesfeld, T. F. Fuller "Proton Conducting Membrane Fuel Cells II" ECS Proc. Vol. 98-27 p. 300-308.

Possible fields of application of the polymer membranes according to the invention include inter alia use in fuel cells, in electrolysis, in capacitors and in battery systems. The polymer membranes are preferably used in fuel cells on account of their properties.

The present invention also relates to a membrane electrodes unit, which comprises at least one polymer membrane according to the invention. The membrane electrode unit is highly efficient, even with a low content of catalytically active substances, such as platinum, ruthenium or palladium. A gas diffusion layer provided with a catalytically active layer may be used for this purpose.

The gas diffusion layer generally has electron conductivity. Flat, electrically conductive, acid-resistant configurations are usually used for this purpose. These include, for example, carbon fibre papers, graphitised carbon fibre papers, carbon fibre fabric, graphitised carbon fibre fabric and/or sheets which have been rendered conductive by the addition of carbon black.

The catalytically active layer contains a catalytically active substance. These include inter alia precious metals, in particular platinum, palladium, rhodium, iridium and/or ruthenium. These substances may also be used in the form of alloys with one another. Furthermore, these substances may also be used in an alloy with non-precious metals, such as for example Cr, Zr, Ni, Co and/or Ti. In addition, the oxides of the aforementioned precious metals and/or non-precious metals may be used. According to a particular aspect of the present invention, the catalytically active compounds are used in the form of particles, which preferably have a size in the range of 1 to 1000 nm, in particular 10 to 200 nm and preferably 20 to 100 nm.

The catalytically active particles, which comprise the aforementioned substances, may be used as powdered metal, what is known as black precious metal, in particular platinum and/or platinum alloys. Particles of this type generally have a size in the range of 5 nm to 200 nm, preferably in the range of 10 nm to 100 nm.

In addition, the metals may also be used on a support. This support preferably comprises carbon, which may be used, in particular, in the form of carbon black, graphite or graphitised carbon black. The metal content of these supported particles, based on the total weight of the particles, is generally in the range of 1 to 80% by weight, preferably 5 to 60% by weight and particularly preferably 10 to 50% by weight, without being limited thereto. The particle size of the support, in particular the size of the carbon particles, is preferably in the range of 20 to 100 nm, in particular 30 to 60 nm. The size of the metal particles located thereon is preferably in the range of 1 to 20 nm, in particular 1 to 10 nm and particularly preferably 2 to 6 nm.

The sizes of the various particles represent average values of the weight average and may be determined by transmission electron microscopy.

The above-described catalytically active particles are generally commercially available.

Furthermore, the catalytically aktive layer may contain conventional additives. These include inter alia fluorine polymers such as polytetrafluoroethylene (PTFE) and surface-active substances.

Surface-active substances include in particular ionic surfactants, for example fatty acid salts, in particular sodium laurate, potassium oleate; and alkylsulphonic acids, alkylsulphonic acid salts, in particular sodium perfluorohexane-sulphonate, lithium perfluorohexanesulphonate, ammonium perfluorohexanesulphonate, perfluorohexanesulphonic acid, potassium nonafluorobutanesulphonate, and nonionic surfactants, in particular ethoxylated fatty alcohols and polyethyleneglycols.

Particularly preferred additives include fluorine polymers, in particular tetrafluoroethylene polymers. According to a particular embodiment of the present invention, the ratio by weight of fluorine polymer to catalyst material, comprising at least one precious metal and optionally one or more support materials, is greater than 0,1, this ratio preferably being in the range of 0.2 to 0.6.

According to a particular embodiment of the present invention, the catalyst layer has a thickness in the range of 1 to 1000 μm, in particular of 5 to 500, preferably of 10 to 300 μm. This value represents an average value which may be determined by measuring the layer thickness in the cross section of photographs obtained using a scanning electron microscope (SEM).

According to a particular embodiment of the present invention, the precious metal content of the catalyst layer is 0.1 to 10.0 mg/cm$^2$, preferably 0.3 to 6.0 mg/cm$^2$ and particularly preferably 0.3 to 3.0 mg/cm$^2$. These values may be determined by elemental analysis of a flat sample.

A membrane electrode unit may also be produced inter alia by hot pressing. For this purpose, the electrode assembly, consisting of gas diffusion layers provided with catalytically active layers, and a membrane is heated to a temperature in the range of 50° C. to 200° C. and pressed at a pressure of 0.1 to 5 MPa. A few seconds are generally sufficient to join the catalyst layer to the membrane. This time is preferably in the range of 1 second to 5 minutes, in particular 5 seconds to 1 minute.

The present invention also relates to a proton-conducting polymer membrane according to the invention, coated with a catalyst layer.

A catalyst layer may be applied to the membrane by various methods. For example, a support provided with a catalyst-containing coating may be used, to provide the membrane according to the invention with a catalyst layer.

The membrane may be provided with a catalyst layer on one or both sides. If the membrane is provided with a catalyst layer only on one side, the opposite side of the membrane has to be pressed with an electrode comprising a catalyst layer. If both sides of the membrane are to be provided with a catalyst layer, the following methods may also be combined to achieve an optimum result.

According to the invention, the catalyst layer may be applied by a process in which a catalyst suspension is used. In addition, catalyst-containing powders may also be used.

The catalyst suspension contains a catalytically active substance. These substances have previously been described in more detail in conjunction with the catalytically active layer.

Furthermore, the catalyst suspension may contain conventional additives. These include inter alia fluorine polymers such as polytetrafluoroethylene (PTFE), thickeners, in particular water-soluble polymers such as cellulose derivatives, polyvinyl alcohol, polyethyleneglycol, and surface-active substances, which have previously been described in more detail in conjunction with the catalytically active layer.

The surface active substances include, in particular, ionic surfactants, for example fatty acid salts, in particular sodium laurate, potassium oleate; and alkylsulphonic acids, alkylsulphonic acid salts, in particular sodium perfluorohexanesulphonate, lithium perfluorohexanesulphonate, ammonium perfluorohexanesulphonate, perfluorohexanesulphonic acid, potassium nonafluorbutanesulphonate, and nonionic surfactants, in particular ethoxylated fatty alcohols and polyethyleneglycols.

Furthermore, the catalyst suspension may comprise constituents that are liquid at ambient temperature. These include inter alia organic solvents, which may be polar or non-polar, phosphoric acid, polyphosphoric acid and/or water. The catalyst suspension preferably contains 1 to 99% by weight, in particular 10 to 80% by weight, of liquid constituents.

The polar organic solvents include, in particular, alcohols, such as ethanol, propanol, isopropanol and/or butanol.

The organic non-polar solvents include inter alia known thin-film evaporators, such as thin-film evaporator 8470 made by Dupont, which comprises turpentine oils.

Particularly preferred additives include fluorine polymers, in particular tetrafluoroethylene polymers. According to a particular embodiment of the present invention, the ratio by weight of fluorine polymer to catalyst material, comprising at least one precious metal and optionally one or more support materials, is greater than 0.1, this ratio preferably being in the range of 0.2 to 0.6.

The catalyst suspension may be applied to the membrane according to the invention by conventional processes. Various methods of applying the suspension are known, which depend on the viscosity of the suspension, which may also be in paste form. Processes for the coating of films, fabrics, textiles and/or papers, in particular spraying processes and printing processes, such as for example stencil and screen printing processes, inkjet processes, roller application, in particular screen rollers, slot die application and doctoring. The respective process and the viscosity of the catalyst suspension depend on the hardness of the membrane.

The viscosity may be influenced by the solids content, in particular the proportion of catalytically active particles, and the proportion of additives. The viscosity to be adjusted is dependent on the method of application of the catalyst suspension, optimum values and the determination thereof being familiar to the person skilled in the art.

The bond between catalyst and membrane may be improved by heating and/or pressing, depending on the hardness of the membrane.

According to a particular aspect of the present invention, the catalyst layer is applied by a powder process. A powdered catalyst that may contain additional additives, examples of which have been given hereinbefore, is used for this purpose.

The powdered catalyst may be applied inter alia by spraying processes and screening processes. With spraying process, the powder mixture is sprayed onto the membrane using a die, for example a slot die. The membrane provided with a catalyst layer is then generally heated to improve the joint between catalyst and membrane. Heating may be carried out, for example, over a hot roller. Methods of this type and devices for applying the powder are described inter alia in DE 195 09 748, DE 195 09 749 and DE 197 57 492.

During screening processes, the powdered catalyst is applied to the membrane using a vibrating screen. A device for applying a catalyst powder to a membrane is described in WO 00/26982. After application of the powdered catalyst, the bonding of catalyst and membrane may be improved by heating. The membrane provided with at least one catalyst layer may be heated to a temperature in the range of 50 to 200° C., in particular 100 to 180° C.

In addition, the catalyst layer may be applied by a process in which a catalyst-containing coating is applied to a support and the catalyst-containing coating located on the support is then transferred to the membrane according to the invention. A process of this type is described in WO 92/15121.

The support provided with a catalyst coating may for example be produced by producing an above-described catalyst suspension. This catalyst suspension is then applied to a support film, for example of polytetrafluoroethylene. After application of the suspension, the volatile constituents are removed.

The catalyst-containing coating may be transferred inter alia by hot pressing. For this purpose, the assembly comprising a catalyst layer and a membrane and a support film is heated to a temperature in the range of 50° C. to 200° C. and pressed at a pressure of 0.1 to 5 MPa. A few seconds are generally sufficient to bond the catalyst layer to the membrane. This time preferably lies in the range of 1 second to 5 minutes, in particular 5 seconds to 1 minute.

According to a particular embodiment of the present invention, the catalyst layer has a thickness in the range of 1 to 1000

µm, in particular of 5 to 500, preferably of 10 to 300 µm. This value represents an average value which may be determined by measuring the layer thickness in the cross section of photographs which may be taken using a scanning electron microscope (SEM).

According to a particular embodiment of the present invention, the membrane provided with at least one catalyst layer comprises 0.1 to 10.0 mg/cm$^2$, preferably 0.3 to 6.0 mg/cm$^2$ and particularly preferably 0.3 to 3.0 mg/cm$^2$. These values may be determined by elemental analysis of a flat sample.

After being coated with a catalyst, the membrane obtained may be thermally, photochemically, chemically and/or electrochemically crosslinked. This curing of the membrane additionally improves the properties of the membrane. The membrane may be heated to a temperature of at least 150° C., preferably at least 200° C. and particularly preferably at least 250° C. According to a particular embodiment, crosslinking is carried out in the presence of oxygen. The oxygen concentration is preferably in the range of 5 to 50% by volume, preferably 10 to 40% by volume, without being limited thereto.

Crosslinking may also be carried out by the action of IR or NIR (IR=infrared, i.e. light with a wavelength of more than 700 nm; NIR=near IR, i.e. light with a wavelength in the range of approximately 700 to 2000 nm or energy in the range of approximately 0.6 to 1.75 eV) and/or UV-light. A further method is irradiation with β-, γ- and/or electron rays. The radiation dose is preferably between 5 and 200 kGy, in particular 10 to 100 kGy, in this case. Irradiation may be carried out in air or under inert gas. The performance characteristics of the membrane, in particular its durability, are hereby improved.

Depending on the desired degree of crosslinking, the duration of the crosslinking reaction may lie in a broad range. This reaction time generally lies in the range of 1 second to 10 hours, preferably 1 minute to 1 hour, without being limited thereto.

The catalyst-coated polymer membrane according to the invention has better material properties than previously known doped polymer membranes. In particular it has better performance than known doped polymer membranes. This is due, in particular, to better contact between membrane and catalyst.

The membrane according to the invention may be bonded to a gas diffusing layer to produce a membrane electrode unit. If the membrane is provided with a catalyst layer on both sides, the gas diffusing layer need not have a catalyst prior to pressing.

A membrane electrode unit according to the invention has a surprisingly high power density. According to a particular embodiment, preferred membrane electrode units have a current density of at least 0.1 A/cm$^2$, preferably 0.2 A/cm$^2$, particularly preferably 0.3 A/cm$^2$. This current density is measured at normal pressure (absolute 1013 mbar, with open cell output) and 0.6 V cell voltage during operation with pure hydrogen at the anode and air (approximately 20% by volume oxygen, approximately 80% by volume nitrogen) at the cathode. Particularly high temperatures in the range of 150-200° C., preferably 160-180° C., in particular of 170° C. may be employed in the process.

The aforementioned power densities may also be achieved with low stoichiometry of the fuel gases on both sides. According to a particular aspect of the present invention, the stoichiometry is less than or equal to 2, preferably less than or equal to 1.5 more particularly preferably less than or equal to 1.2.

According to a particular embodiment of the present invention, the catalyst layer has a low precious metal content. The precious metal content of a preferred catalyst layer, which is comprised by a membrane according to the invention, is preferably at most 2 mg/cm$^2$, in particular at most 1 mg/cm$^2$, more particularly preferably at most 0.5 mg/cm$^2$. According to a particular aspect of the present invention, one side of a membrane has a higher metal content than the opposite side of the membrane. The metal content of one side is preferably twice as high as the metal content of the opposite side.

In a further variant, a catalytically active layer may be applied to the membrane according to the invention and may be bonded to a gas diffusing layer. For this purpose, a membrane is formed according to steps A) and B) and applied to the catalyst. In a Variant the catalyst may be applied before or together with the initiator solution. The present invention also relates to these configurations.

In addition, formation of the membrane according to steps A) and B) may also be carried out on a support or a support film which comprises the catalyst. After removal of the support or the support film, the catalyst is located on the membrane according to the invention. The present invention also relates to these configurations.

The present invention also relates to a membrane electrode unit containing at least one polymer membrane according to the invention, optionally in combination with a further polymer membrane based on polyazoles or a polymer blend membrane.

Possible fields of application of the polymer membranes according to the invention include inter alia use in fuel cells, in electrolysis, in capacitors and in battery systems. The polymer membranes are preferably used in fuel cells on account of their properties.

PRACTICAL EXAMPLES

Example 1

Production of Vinylsulphonic Acid

A column having a diameter of 5.5 cm is filled with an ion exchange resin consisting of crosslinked sulphonated polystyrene of the Dowex 50W-X4 type available from Aldrich to a height of 20 cm. 100 ml of a 25% aqueous solution of sodium-vinylsulphonic acid-salt (0.19 mol) are allowed to pass through the column, and 80-90 ml (0.16 mol) of vinylsulphonic acid are collected. The volume of the solution is then approximately halved (40-45 ml) using a rotary evaporator.

Example 2

The vinylsulphonic acid solution from Example 1 is mixed together with 56 g of a 90% vinylphosphonic acid and treated in an oven at a temperature of 70° C. for 1 hour. 5 g bisphenol-A diepoxyacrylate (CN-120 from Sartomer Inc.) and 8 g 1-hydroxycyclohexyl phenyl ketone (Igacure 184 from Ciba Geigy) are added to this mixture. The mixture is then stirred until a homogeneous solution forms. The solution is again treated for 30 minutes in the oven at 70° C. 0.5 g of a film of high-molecular polybenzimidazole produced from a PBI-DMac solution according to DE 10052237.8 and by selection of suitable polymer pellets according to DE 10129458.1 is immersed into the solution. The solution is covered with an aluminium foil for light protection and is kept in the oven at 80° C. for 3 hours. Excess liquid is dabbed from the membrane surface. The resultant film is then placed between two transparent sheets of orientated polypropylene and excess air is removed by repeated rolling, as described hereinbefore. This laminate is then transferred into a chamber where each page is irradiated for 1 minute using a 300 W mercury arc lamp of the H3T7 type from General Electric, and this process is repeated once. The polypropylene film is carefully removed from the membrane. This process is simplified by heating gently with a hot air dryer. 350% by weight is a typical increase in weight after this treatment.

Example 3

20 g (0.97 mol) of a sodium styrenesulphonic acid salt from Aldrich is mixed with 200 ml of distilled water at ambient temperature. The ion exchange process is then repeated, as described in Example 1, and 160 ml of a styrenesulphonic acid solution are obtained. This amount of solution is then reduced to 60 ml using a rotary evaporator. 100 ml of vinylphosphonic acid are added to this solution and the mixture is stirred in the dark for 24 h. 8 g of bisphenol-A diepoxyacrylate (CN-120 from Sartomer Inc.) and 5.5 g of 1-hydroxycyclohexyl phenyl ketone (Irgacure 184 from Ciba Geigy) are added to this solution. The mixture is then treated for 4 hours in an oven at 70° C. with occasional stirring. 0.4 g of a film of high-molecular polybenzimidazole produced from a PBI-DMac solution according to DE 10052237.8 and by selection of suitable polymer pellets according to DE 10129458.1 are immersed into the mixture. The mixture is covered with an aluminium foil for light protection and is kept in the oven at 80° C. for 3 h. Excess liquid is dabbed from the membrane surface. The resultant film is then placed between two transparent sheets of orientated polypropylene and excess air is removed by repeated rolling, as described hereinbefore. This laminate is then transferred into a chamber where each page is irradiated for 1 minute using a 300 W mercury arc lamp of the H3T7 type from General Electric, and this process is repeated once. The polypropylene film is carefully removed from the membrane. 270% by weight is a typical increase in weight after this treatment.

The invention claimed is:

1. A proton-conducting electrolyte membrane obtained by a process comprising the steps of:
    a) swelling a polymer film with a liquid comprising a vinyl-containing sulphonic acid and vinyl-containing phosphonic acid, wherein the polymer film comprises after swelling at least 10% by weight vinyl-containing sulphonic acid and vinyl-containing phosphonic acid; and
    b) polymerizing the vinyl-containing sulphonic acid and vinyl-containing phosphonic acid present in the liquid introduced in step a),
    wherein the membrane obtained in step (b) comprises at least 10% by weight of polyvinyl-containing phosphonic acid,
    and wherein the conductivity of the membrane at temperatures of 160° C. is at least 0.001 S/cm wherein this value is achieved without humidification and
    wherein the polyvinyl containing phosphonic and sulphonic acid formed in step b) forms an inter-penetrating network with the polymer of the polymer film from step a).

2. The membrane of claim 1, characterized in that the polymers used in step a) are polymers that are stable at high temperatures and contain at least one nitrogen, oxygen, or sulphur atom in one or more repeat units.

3. The membrane of claim 1, characterized in that the liquid comprising a vinyl-containing sulphonic acid contains compounds of the formula

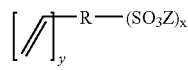

wherein
    R represents a bond, a C1-C15 alkyl group, a C1-C15 alkoxy group, ethyleneoxy group or C5-C20 aryl or heteroaryl group, in which the aforementioned radicals are optionally substituted by halogen, —OH, COOZ, —CN, or NZ$_2$,
    Z represents, independently of one another, hydrogen, C1-C15 alkyl group, C1-C15 alkoxy group, ethyleneoxy group or C5-C20 aryl or heteroaryl group, in which the aforementioned radicals are optionally substituted by halogen, —OH, —CN, and
    x represents an integer 1, 2, 3, 4, 5, 6, 7, 8, 9 or 10
    y represents an integer 1, 2, 3, 4, 5, 6, 7, 8, 9 or 10 or the formula

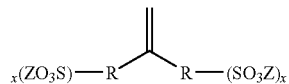

wherein
    R represents a bond, a C1-C15 alkyl group, C1-C15 alkoxy group, ethyleneoxy group or C5-C20 aryl or heteroaryl group, in which the aforementioned radicals are optionally substituted by halogen, —OH, COOZ, —CN, NZ$_2$,
    Z represents, independently of one another, hydrogen, C1-C15 alkyl group, C1-C15 alkoxy group, ethyleneoxy group or C5-C20 aryl or heteroaryl group, in which the aforementioned radicals are optionally substituted by halogen, —OH, —CN, and
    x represents an integer 1, 2, 3, 4, 5, 6, 7, 8, 9 or 10
or the formula

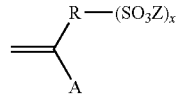

wherein
    A represents a group of the formulae COOR$^2$, CN, CONR$^2_2$, OR$^2$ and/or R$^2$, wherein R$^2$ represents hydrogen, a C1-C15 alkyl group, C1-C15 alkoxy group, ethyleneoxy group or C5-C20 aryl or heteroaryl group, in which the aforementioned radicals are optionally substituted by halogen, —OH, COOZ, —CN, NZ$_2$,
    R represents a bond, a divalent C1-C15 alkylene group, divalent C1-C15 alkyleneoxy group, in which the aforementioned radicals are optionally substituted by halogen, —OH, COOZ, —CN, NZ$_2$,
    Z represents, independently of one another, hydrogen, C1-C15 alkyl group, C1-C15 alkoxy group, ethyleneoxy group or C5-C20 aryl or heteroaryl group, in which the aforementioned radicals are optionally substituted by halogen, —OH, —CN, and
    x represents an integer 1, 2, 3, 4, 5, 6, 7, 8, 9 or 10.

4. The membrane of claim 1, characterized in that the liquid comprising a vinyl-containing sulphonic acid contains compounds of the formula

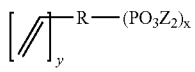

wherein
R represents a bond, a C1-C15 alkyl group, C1-C15 alkoxy group, ethyleneoxy group or C5-C20 aryl or heteroaryl group, in which the aforementioned radicals are optionally substituted by halogen, —OH, COOZ, —CN, $NZ_2$,
Z represents, independently of one another, hydrogen, C1-C15 alkyl group, C1-C15 alkoxy group, ethyleneoxy group or C5-C20 aryl or heteroaryl group, in which the aforementioned radicals are optionally substituted by halogen, —OH, —CN, and
x represents an integer 1, 2, 3, 4, 5, 6, 7, 8, 9 or 10
y represents an integer 1, 2, 3, 4, 5, 6, 7, 8, 9 or 10
or of the formula

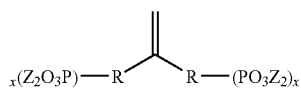

wherein
R represents a bond, a C1-C15 alkyl group, C1-C15 alkoxy group, ethyleneoxy group or C5-C20 aryl or heteroaryl group, in which the aforementioned radicals are optionally substituted by halogen, —OH, COOZ, —CN, $NZ_2$,
Z represents, independently of one another, hydrogen, C1-C15 alkyl group, C1-C15 alkoxy group, ethyleneoxy group or C5-C20 aryl or heteroaryl group, in which the aforementioned radicals are optionally substituted by halogen, —OH, —CN, and
x represents an integer 1, 2, 3, 4, 5, 6, 7, 8, 9 or 10
or of the formula

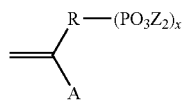

wherein
A represents a group of the formulae $COOR^2$, CN, $CONR^2_2$, $OR^2$ or $R^2$, wherein $R^2$ represents hydrogen, a C1-C15 alkyl group, C1-C15 alkoxy group, ethyleneoxy group or C5-C20 aryl or heteroaryl group, in which the aforementioned radicals are optionally substituted by halogen, —OH, COOZ, —CN, $NZ_2$,
R represents a bond, a divalent C1-C15 alkylene group, divalent C1-C15 alkyleneoxy group, in which the aforementioned radicals are optionally substituted by halogen, —OH, COOZ, —CN, $NZ_2$,
Z represents, independently of one another, hydrogen, a C1-C15 alkyl group, C1-C15 alkoxy group, ethyleneoxy group or C5-C20 aryl or heteroaryl group, in which the aforementioned radicals are optionally substituted by halogen, —OH, —CN, and
x represents an integer 1, 2, 3, 4, 5, 6, 7, 8, 9 or 10.

5. The membrane of claim 1, characterized in that the liquid comprising a vinyl-containing sulphonic acid contains at least one substance capable of forming radicals.

6. The membrane of claim 1, characterized in that the polymerization in step b) is carried out by irradiation with I or NIR light, UV-light, β, γ and/or electron rays.

7. The membrane of claim 1, characterized in that the membrane comprises a layer containing a catalytically active component.

8. The membrane of claim 1, characterized in that the liquid comprising a vinyl-containing sulphonic acid contains phosphonic acid and compounds of the formula

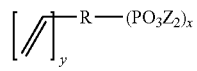

wherein
R represents a bond, a C1-C15 alkyl group, C1-C15 alkoxy group, ethyleneoxy group or C5-C20 aryl or heteroaryl group, in which the aforementioned radicals are optionally substituted by halogen, —OH, COOZ, —CN, $NZ_2$,
Z represents, independently of one another, hydrogen, C1-C1-5 alkyl group, C1-C15 alkoxy group, ethyleneoxy group or C5-C20 aryl or heteroaryl group, in which the aforementioned radicals are optionally substituted by halogen, —OH, —CN, and
x represents an integer 1, 2, 3, 4, 5, 6, 7, 8, 9 or 10
y represents an integer 1, 2, 3, 4, 5, 6, 7, 8, 9 or 10
or of the formula

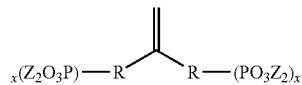

wherein
R represents a bond, a C1-C15 alkyl group, C1-C15 alkoxy group, ethyleneoxy group or C5-C20 aryl or heteroaryl group, in which the aforementioned radicals are optionally substituted by halogen, —OH, COOZ, —CN, $NZ_2$,
Z represents, independently of one another, hydrogen, C1-C15 alkyl group, C1-C15 alkoxy group, ethyleneoxy group or C5-C20 aryl or heteroaryl group, in which the aforementioned radicals are optionally substituted by halogen, —OH, —CN, and
x represents an integer 1, 2, 3, 4, 5, 6, 7, 8, 9 or 10
or of the formula

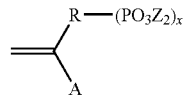

wherein
A represents a group of the formulae $COOR^2$, CN, $CONR^2_2$, $OR^2$ or $R^2$, wherein $R^2$ represents hydrogen, a C1-C15 alkyl group, C1-C15 alkoxy group, ethyleneoxy group or C5-C20 aryl or heteroaryl group, in which the aforementioned radicals are optionally substituted by halogen, —OH, COOZ, —CN, $NZ_2$,
R represents a bond, a divalent C1-C15 alkylene group, divalent C1-C15 alkyleneoxy group, in which the aforementioned radicals are optionally substituted by halogen, —OH, COOZ, —CN, NZ$_2$, Z represents, independently of one another, hydrogen, a C1-C15 alkyl group, C1-C15 alkoxy group, ethyleoneoxy group or C5-C20 aryl or heteroaryl group, in which the aforementioned radicals are optionally substituted by halogen, —OH, —CN, and x represents an integer 1, 2, 3, 4, 5, 6, 7, 8, 9 or 10; and the ratio by weight of vinyl-containing phosphonic acid to vinyl-containing sulphonic acid lies in the range of 1:100 to 99:1.

9. The proton-conducting electrolyte membrane of claim 1, wherein the liquid swollen polymer film comprises after swelling at least 30% by weight vinyl-containing sulphonic.

10. The proton-conducting electrolyte membrane of claim 1, wherein the proportion of polyvinyl-containing phosphonic acid is from 10% to 97% by weight.

11. The proton-conducting electrolyte membrane of claim 1, wherein the membrane obtained in step (b) comprises between 1% and 90% by weight of the polymer.

12. A proton-conducting electrolyte membrane obtained by a process comprising the steps of:
  a) swelling a polymer film with a liquid comprising a vinyl-containing sulphonic acid and vinyl-containing phosphonic acid, wherein the polymer film comprises after swelling at least 10% by weight vinyl-containing sulphonic acid and vinyl-containing phosphonic acid; and
  b) polymerizing the vinyl-containing sulphonic acid and vinyl-containing phosphonic acid present in the liquid introduced in step a),
  wherein the membrane obtained in step (b) comprises from 20% to 95% by weight of polyvinyl-containing phosphonic acid,
  and wherein the conductivity of the membrane at temperatures of 160° C. is at least 0.001 S/cm wherein this value is achieved without humidification and
  wherein the polyvinyl containing phosphonic and sulphonic acid formed in step b) forms an inter-penetrating network with the polymer of the polymer film from step a).

13. A proton-conducting electrolyte membrane obtained by a process comprising the steps of:
  a) swelling a polymer film with a liquid comprising a vinyl-containing sulphonic acid and vinyl-containing phosphonic acid, wherein the polymer film comprises after swelling at least 10% by weight vinyl-containing sulphonic acid and vinyl-containing phosphonic acid; and
  b) polymerizing the vinyl-containing sulphonic acid and vinyl-containing phosphonic acid present in the liquid introduced in step a),
  wherein the liquid used in step (a) comprises vinyl-containing phosphonic acid in the amount of at least 20% by weight, thereby imparting onto the proton-conducting electrolyte membrane obtained in step (b) the conductivity at temperatures of 160° C. of at least 0.001 S/cm
  wherein this value is achieved without humidification and
  wherein the polyvinyl containing phosphonic and sulphonic acid formed in step b) forms an inter-penetrating network with the polymer of the polymer film from step a).

* * * * *